(12) United States Patent
DelloStritto et al.

(10) Patent No.: US 8,402,161 B2
(45) Date of Patent: Mar. 19, 2013

(54) COMMUNICATION OF INFORMATION BETWEEN A PLURALITY OF NETWORK ELEMENTS

(75) Inventors: James J. DelloStritto, Jordan, NY (US); Ronald J. Blaszak, Syracuse, NY (US); Chad E. Craw, Fulton, NY (US); Cory Russell Gondek, Tigard, OR (US); Frank LoMascolo, Auburn, NY (US); Eric G. Petersen, Aloha, OR (US); Kenneth G. West, Aloha, OR (US); Albert Goldfain, Williamsville, NY (US); Mahesh Narayan, Syracuse, NY (US); Song Y. Chung, Canton, GA (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 1093 days.

(21) Appl. No.: 11/905,811

(22) Filed: Oct. 4, 2007

(65) Prior Publication Data

US 2008/0082683 A1 Apr. 3, 2008

Related U.S. Application Data

(63) Continuation-in-part of application No. 11/663,395, filed as application No. PCT/US2006/011373 on Mar. 30, 2006.

(60) Provisional application No. 60/787,147, filed on Mar. 28, 2006, provisional application No. 60/667,203, filed on Mar. 30, 2005.

(51) Int. Cl.
*G06F 15/16* (2006.01)
*A61B 5/00* (2006.01)

(52) U.S. Cl. ........................................ 709/236; 600/365

(58) Field of Classification Search .................. 709/236
See application file for complete search history.

(56) References Cited

U.S. PATENT DOCUMENTS

| | | | |
|---|---|---|---|
| 5,261,080 A | 11/1993 | Khoyi et al. | |
| 5,307,262 A | 4/1994 | Ertel | |
| 5,446,880 A | 8/1995 | Balgeman et al. | |
| 5,517,622 A | 5/1996 | Ivanoff | |
| 5,664,126 A | 9/1997 | Hirakawa | |
| 5,708,828 A | 1/1998 | Coleman | |
| 5,710,908 A * | 1/1998 | Man | 709/230 |
| 5,721,895 A | 2/1998 | Velissaropoulos et al. | |
| 5,724,580 A * | 3/1998 | Levin et al. | 1/1 |
| 5,734,907 A | 3/1998 | Jarossay et al. | |

(Continued)

FOREIGN PATENT DOCUMENTS

| | | |
|---|---|---|
| EP | 0640913 A3 | 3/1995 |
| EP | 1407714 A1 | 4/2004 |

(Continued)

OTHER PUBLICATIONS

International Search Report & Written Opinion for PCT/US2006/011373, dated Feb. 6, 2008.

(Continued)

*Primary Examiner* — Brian P Whipple
*Assistant Examiner* — James Edwards
(74) *Attorney, Agent, or Firm* — Merchant & Gould P.C.

(57) ABSTRACT

A communications protocol interface may be configured as being divisible into a core portion and an extensible portion. The extensible portion of the communications protocol interface may be further configured so that each network element can communicate a unique and optimally small subset of actual interoperable data that corresponds to at least a portion of a larger defined data set. A software generator program may be configured to generate a set of extensible source code that operates upon the subset of actual data and that directs the execution of the extensible portion of the communications protocol interface for a particular network element.

12 Claims, 34 Drawing Sheets

U.S. PATENT DOCUMENTS

| | | | |
|---|---|---|---|
| 5,857,195 A | 1/1999 | Hayashi et al. | |
| 5,892,925 A * | 4/1999 | Aditya et al. | 709/230 |
| 5,999,979 A | 12/1999 | Vellanki et al. | |
| 6,026,392 A | 2/2000 | Kouchi et al. | |
| 6,050,940 A | 4/2000 | Braun | |
| 6,130,917 A | 10/2000 | Monroe | |
| 6,190,313 B1 | 2/2001 | Hinkle | |
| 6,193,654 B1 | 2/2001 | Richardson et al. | |
| 6,226,620 B1 | 5/2001 | Oon | |
| 6,249,668 B1 | 6/2001 | Abe et al. | |
| 6,250,309 B1 | 6/2001 | Krichen et al. | |
| 6,275,869 B1 | 8/2001 | Sieffert et al. | |
| 6,330,572 B1 | 12/2001 | Sitka | |
| 6,332,163 B1 | 12/2001 | Bowman-Amuah | |
| 6,400,286 B1 | 6/2002 | Cooper | |
| 6,496,851 B1 * | 12/2002 | Morris et al. | 709/204 |
| 6,584,445 B2 | 6/2003 | Papageorge | |
| 6,616,606 B1 | 9/2003 | Petersen | |
| 6,625,617 B2 | 9/2003 | Yarnall et al. | |
| 6,633,833 B2 | 10/2003 | Sharma et al. | |
| 6,644,322 B2 | 11/2003 | Webb | |
| 6,651,104 B1 * | 11/2003 | Moon | 709/238 |
| 6,665,725 B1 | 12/2003 | Dietz | |
| 6,669,631 B2 | 12/2003 | Norris et al. | |
| 6,697,103 B1 | 2/2004 | Fernandez et al. | |
| 6,721,286 B1 | 4/2004 | Williams et al. | |
| 6,766,361 B1 | 7/2004 | Venigalla | |
| 6,779,004 B1 | 8/2004 | Zintel | |
| 6,792,431 B2 | 9/2004 | Tamboli et al. | |
| 6,801,331 B1 | 10/2004 | Motoyama | |
| 6,820,135 B1 | 11/2004 | Dingman | |
| 6,839,717 B1 | 1/2005 | Motoyama et al. | |
| 6,848,108 B1 | 1/2005 | Caron | |
| 6,915,312 B2 | 7/2005 | Bodnar et al. | |
| 6,940,807 B1 | 9/2005 | Rezvani | |
| 6,942,616 B2 | 9/2005 | Kerr, II | |
| 6,951,539 B2 | 10/2005 | Bardy | |
| 6,978,422 B1 | 12/2005 | Bushe et al. | |
| 6,993,536 B2 | 1/2006 | Yamanaka | |
| 7,016,963 B1 | 3/2006 | Judd et al. | |
| 7,054,924 B1 | 5/2006 | Harvey et al. | |
| 7,065,579 B2 | 6/2006 | Traversat | |
| 7,124,299 B2 | 10/2006 | Dick et al. | |
| 7,136,927 B2 | 11/2006 | Traversat | |
| 7,181,508 B1 | 2/2007 | Sretenovic | |
| 7,200,671 B1 | 4/2007 | Lev-Ami | |
| 7,321,861 B1 | 1/2008 | Oon | |
| 7,340,500 B2 | 3/2008 | Traversat | |
| 7,360,154 B2 | 4/2008 | Gale | |
| 7,389,474 B2 | 6/2008 | Retting | |
| 7,392,255 B1 | 6/2008 | Sholtis | |
| 7,408,932 B2 | 8/2008 | Kounavis et al. | |
| 7,653,227 B2 | 1/2010 | Krishnan | |
| 7,725,606 B2 | 5/2010 | Lev-Ami | |
| 7,783,637 B2 | 8/2010 | Bitsch | |
| 7,788,648 B2 | 8/2010 | Bossom | |
| 7,966,078 B2 | 6/2011 | Hoffberg | |
| 2001/0011222 A1 | 8/2001 | McLauchlin | |
| 2001/0023315 A1 | 9/2001 | Flach et al. | |
| 2001/0044809 A1 | 11/2001 | Parasnis et al. | |
| 2001/0052012 A1 | 12/2001 | Rinne | |
| 2002/0010797 A1 | 1/2002 | Moulton | |
| 2002/0013518 A1 | 1/2002 | West | |
| 2002/0023172 A1 | 2/2002 | Gendron | |
| 2002/0037035 A1 | 3/2002 | Singh | |
| 2002/0072933 A1 | 6/2002 | Vonk et al. | |
| 2002/0099854 A1 | 7/2002 | Jorgensen | |
| 2002/0128862 A1 | 9/2002 | Lau | |
| 2002/0143824 A1 | 10/2002 | Lee et al. | |
| 2002/0184384 A1 | 12/2002 | Simmon et al. | |
| 2003/0004403 A1 * | 1/2003 | Drinan et al. | 600/301 |
| 2003/0037043 A1 | 2/2003 | Chang et al. | |
| 2003/0074248 A1 * | 4/2003 | Braud et al. | 705/9 |
| 2003/0093459 A1 * | 5/2003 | Dowling et al. | 709/201 |
| 2003/0177035 A1 | 9/2003 | Oka | |
| 2003/0212982 A1 | 11/2003 | Brooks et al. | |
| 2003/0233250 A1 | 12/2003 | Joffe et al. | |
| 2004/0030763 A1 | 2/2004 | Manter | |
| 2004/0044545 A1 | 3/2004 | Wiesmann et al. | |
| 2004/0088374 A1 | 5/2004 | Webb et al. | |
| 2004/0143677 A1 | 7/2004 | Novak | |
| 2004/0172442 A1 | 9/2004 | Ripley | |
| 2004/0176983 A1 | 9/2004 | Birkett et al. | |
| 2004/0215830 A1 | 10/2004 | Shenfield | |
| 2005/0038326 A1 * | 2/2005 | Mathur | 600/300 |
| 2005/0054921 A1 | 3/2005 | Katsman et al. | |
| 2005/0071316 A1 | 3/2005 | Caron | |
| 2005/0071324 A1 | 3/2005 | Bitsch et al. | |
| 2005/0071486 A1 | 3/2005 | Vu et al. | |
| 2005/0091358 A1 | 4/2005 | Mehra et al. | |
| 2005/0125778 A1 | 6/2005 | Fleegal | |
| 2005/0154855 A1 * | 7/2005 | Harris et al. | 711/206 |
| 2005/0165947 A1 | 7/2005 | Auriemma et al. | |
| 2005/0198364 A1 | 9/2005 | Val et al. | |
| 2005/0204022 A1 | 9/2005 | Johnston et al. | |
| 2005/0273772 A1 | 12/2005 | Matsakis | |
| 2006/0017563 A1 | 1/2006 | Rosenfeld et al. | |
| 2006/0069605 A1 | 3/2006 | Hatoun | |
| 2006/0101109 A1 * | 5/2006 | Nishio | 709/200 |
| 2006/0111936 A1 | 5/2006 | Mahesh et al. | |
| 2006/0129435 A1 | 6/2006 | Smitherman et al. | |
| 2006/0168513 A1 | 7/2006 | Coulson et al. | |
| 2006/0200259 A1 | 9/2006 | Hoffberg | |
| 2007/0027670 A1 | 2/2007 | Verhey-Henke | |
| 2007/0061393 A1 | 3/2007 | Moore | |
| 2007/0073872 A1 | 3/2007 | Wille | |
| 2007/0094548 A1 | 4/2007 | Lev-Ami | |
| 2007/0156726 A1 | 7/2007 | Levy | |
| 2007/0208865 A1 * | 9/2007 | Morris et al. | 709/228 |
| 2008/0052384 A1 | 2/2008 | Marl et al. | |
| 2008/0082683 A1 | 4/2008 | DelloStritto | |
| 2008/0133699 A1 | 6/2008 | Craw et al. | |
| 2008/0134133 A1 | 6/2008 | DelloStritto et al. | |
| 2008/0140770 A1 | 6/2008 | DelloStritto et al. | |
| 2009/0037514 A1 | 2/2009 | Lankford et al. | |
| 2010/0005448 A1 | 1/2010 | DelloStritto et al. | |
| 2011/0022748 A1 | 1/2011 | Edwards et al. | |
| 2011/0179405 A1 * | 7/2011 | Dicks et al. | 717/168 |

FOREIGN PATENT DOCUMENTS

| | | |
|---|---|---|
| WO | WO03/067842 A2 | 8/2003 |
| WO | WO2005/043386 A1 | 5/2005 |
| WO | WO2005/067210 A1 | 7/2005 |
| WO | WO2006/105139 A2 | 10/2006 |
| WO | WO2008/045276 A2 | 4/2008 |

OTHER PUBLICATIONS

Baird et al: "Communicating Data from Wireless Sensor Networks Using the HL7v3 Standard"; IEEE Computer Society; Proceedings of the International Workshop on Wearable and Implantable Body Sensor Networks; 183-186; Apr. 3, 2006; 4 pages.

Dolin et al: "HL7 Clinical Document Architecture, Release 2"; Journal of The American Medical Informatics Association, Hanley and Belfus, PA, US; vol. 13, No. 1; Jan. 1, 2006; 10 pages.

Helfenbein et al: "Philips Medical Systems Support for Open ECG and Standardization Efforts"; Computers in Cardiology 2004; 31:393-396; Chicago, IL; Sep. 19, 2004; 4 pages.

Norgall, Thomas: "ECG Data Interchange Formats and Protocols—Status and Outlook"; 2nd Open ECG Workshop 2004; Berlin, Germany; Apr. 1, 2004; accessed at: http://www.openecg.net/WS2_proceedings/Session05/S5.2_PA.pdf; retrieved on Jul. 11, 2008; 2 pages.

Ruiz et al: "An Open Standard Platform for Interoperability of Medical Devices"; Studies in Health Technology and Informatics, 1005-1009, IOS Press, Amsterdam, NL; Jan. 1, 2000; 6 pages.

WIPO Publication (WO 2008/045276 A3) of International Search Report for International Application No. PCT/US2007/021296, mailed Nov. 18, 2008 (9 pages).

Yao et al: "Applying The ISO/IEEE 11073 Standards to Wearable Home Health Monitoring Systems"; Journal of Clinical Monitoring and Computing vol. 19 No. 6: 427-436; Dec. 1, 2005; 10 pages.

* cited by examiner

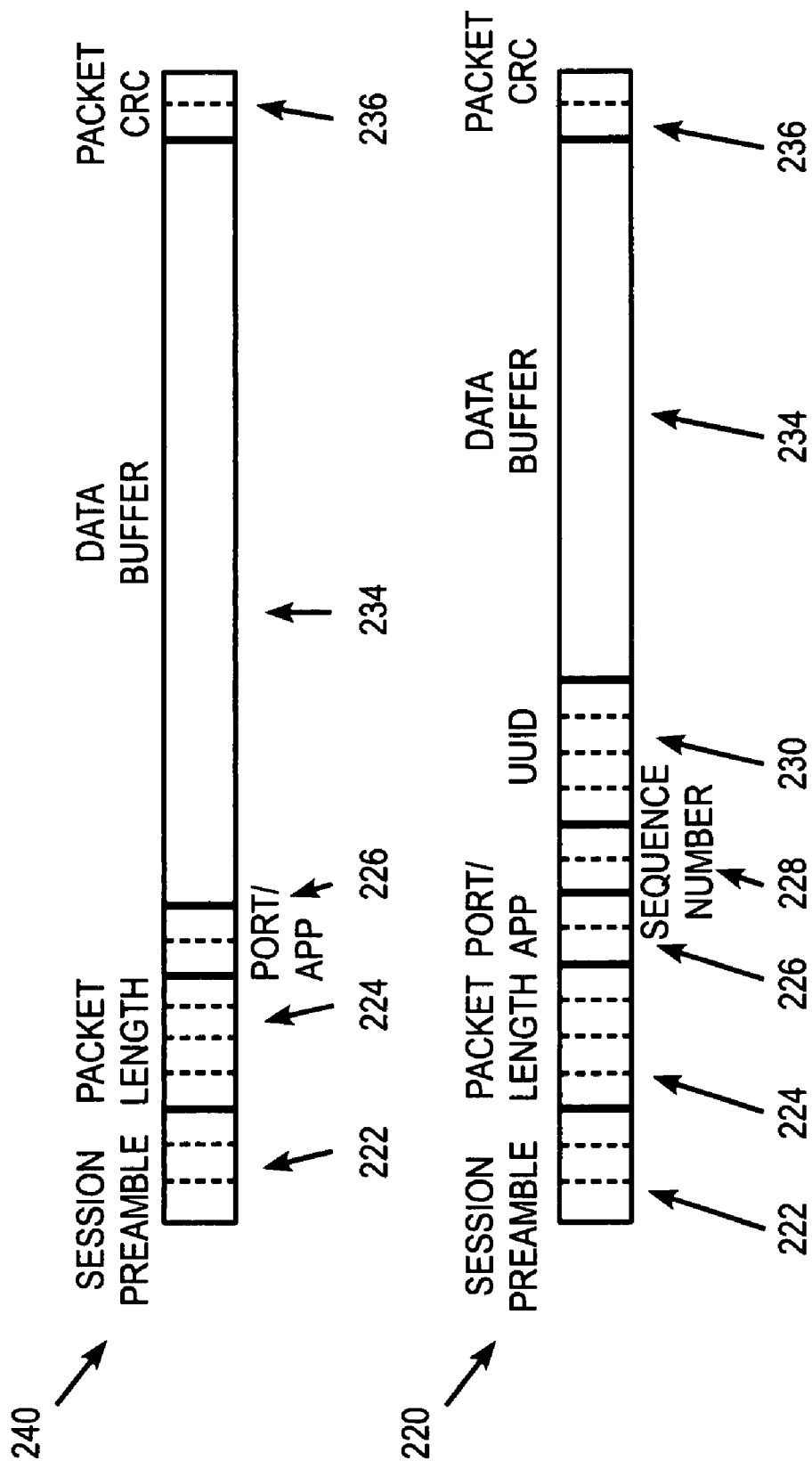

FIG. 3A-3

| PREDICATE — 311 | | | |
|---|---|---|---|
| 1 | 1 | 1 | = BP Information request |
| 1 | 1 | 2 | = BP Configuration request |
| 1 | 2 | 1 | = BP Information response |
| 1 | 2 | 2 | = BP Configuration response |
| 1 | 3 | 1 | = BP Write Command |
| 1 | 3 | 2 | = BP Execute Command |
| 1 | 4 | 1 | = BP Steam |
| 1 | 5 | 1 | = BP Status |

| SUBJECT — 313 | | | |
|---|---|---|---|
| 1 | 6 | 1 | = diagnostic results for a Non invasive blood Pressure (NIBP) |
| 1 | 6 | 2 | = a cuff pressure valve. |
| 1 | 6 | 3 | = a heart rate value as determined by the cuff. |

← 316
← 314
← 312

Step 1 — 315

| 1 | 1 | 1 | + | 1 | 6 | 2 |

Blood Pressure Information Request + Cuff Pressure...

Step 2 — 317

| 1 | 2 | 1 | + | 1 | 6 | 2 | Data |

Blood Pressure Information Response + Cuff Pressure

Step 1 — 315
REQUEST FOR BP CUFF PRESSURE - (Give me your Cuff Pressure.)

| 1 | 1 | + | 1 | 6 | 2 |

*Blood Pressure Information Request + Cuff Pressure...*

Step 2 — 317
POSITIVE RESPONSE - (My Cuff Pressure is N.) — 325

| 1 | 2 | 1 | + | 1 | 6 | 2 | Data |

*Blood Pressure Information Response + Cuff Pressure...*

NEGATIVE RESPONSE OPTION 1 - (No!) — 319

| 20 | 8 | 1 | + | e-code |

*No-acknowledge (includes an error code)*

NEGATIVE RESPONSE OPTION 2 (No I am busy.) — 321

| 20 | 8 | 1 | + | e-code | 21 | 8 | 3 | Data |

*No-acknowledge + Reason. (reason contains the code plus human readable data)*

Step 3 — 323
REQUEST FOR ERROR INFORMATION - (Give me your Error definition for e-code.) — 327

| 21 | 1 | 1 | + | e-code |

*Error Information Request + Error Number...*

RESPONSE - (Error information for e-code is "I am busy".) — 329

| 21 | 2 | 1 | + | 21 | 8 | 3 | Data |

*Error Information Response + Human readable error information*

Step 1
WRITE BLOOD PRESSURE CONFIGURATION DATA - - (Write Blood pressure configuration data...)

| 1 | 3 | 1 | + | 1 | 7 | n | Data |

*Blood Pressure Command Write + some configuration information...*

Step 2
POSITIVE RESPONSE - (Yes)

| 20 | 8 | 0 | e-code |

*Trap (acknowledge or Yes) Message includes an error code likely to be zero*

NEGATIVE RESPONSE OPTION 1 - (No!)

| 20 | 8 | 1 | e-code |

*Trap (no-acknowledge or no). Message includes an error code.*

NEGATIVE RESPONSE OPTION 2 (No I am busy.)

| 20 | 8 | 1 | + | 21 | 8 | 3 | Data |

*No-acknowledge + Reason. (reason contains the code plus human readable data)*

Step 3 — 331
REQUEST FOR ERROR INFORMATION - (Give me your Error definition for e-code.)

| 21 | 1 | 1 | e-code |

*Error Information Request + Error Number...*

RESPONSE - (Error information for e-code is "I am busy".)

| 21 | 2 | 1 | + | 21 | 8 | 3 | Data |

*Error Information Response + Human readable error information*

FIG. 3A-7

Step 1
START A BLOOD PRESSURE CYCLE - (Start taking a blood pressure...)

| 1 | 3 | 1 | + | 1 | 8 | 1 | Data |

*Blood Pressure Command Execute + parameter ("Start_BP")*

Step 2
POSITIVE RESPONSE - (Yes)

| 20 | 8 | 0 | e-code |

*Trap (acknowledge or Yes) Message includes an error code likely to be zero.*

NEGATIVE RESPONSE OPTION 1 - (No!)

| 20 | 8 | 1 | e-code |

*Trap (no-acknowledge or no). Message includes an error code.*

NEGATIVE RESPONSE OPTION 2 (No I am busy.)

| 20 | 8 | 1 | + | 21 | 8 | 3 | Data |

⎯333

*No-acknowledge + Reason. (reason contains the code plus human readable data)*

Step 3
REQUEST FOR ERROR INFORMATION - (Give me your Error definition for e-code.)

| 21 | 1 | 1 | e-code |

*Error Information Request + Error Number...*

RESPONSE - (Error information for e-code is "I am busy".)

| 21 | 2 | 1 | + | 21 | 8 | 3 | Data |

*Error Information Response + Human readable error information*

Step 1
REPORT THE CUFF PRESSURE - (Send Cuff pressure...)

| 1 | 5 | 1 | + | 1 | 6 | 2 | Data |

*Blood Pressure Information Report +Cuff Pressure...*

Step 2
POSITIVE RESPONSE - (Yes)

| 20 | 8 | 0 | e-code |

*Trap (acknowledge or Yes) Message includes an error code likely to be zero.*

NEGATIVE RESPONSE OPTION 1 - (No!)

| 20 | 8 | 1 | e-code |

*Trap (no-acknowledge or no). Message includes an error code.*

NEGATIVE RESPONSE OPTION 2 (No I am busy.)

| 20 | 8 | 1 | + | e-code | + | 21 | 8 | 3 | Data |

*No-acknowledge + Reason. (reason contains the code plus human readable data)*

Step 3 — 335
REQUEST FOR ERROR INFORMATION - (Give me your Error definition for e-code.)

| 21 | 1 | 1 | e-code |

*Error Information Request + Error Number...*

RESPONSE - (Error information for e-code is "I am busy".)

| 21 | 2 | 1 | + | 21 | 8 | 3 | Data |

*Error Information Response + Human readable error information*

Step 1

STREAM THE CUFF PRESSURE - (Steam Cuff pressure...) — 337

| 1 | 5 | 1 | + | 1 | 6 | 2 | Data |

*Blood Pressure Information Report + Cuff Pressure...*

FIG. 3A-10

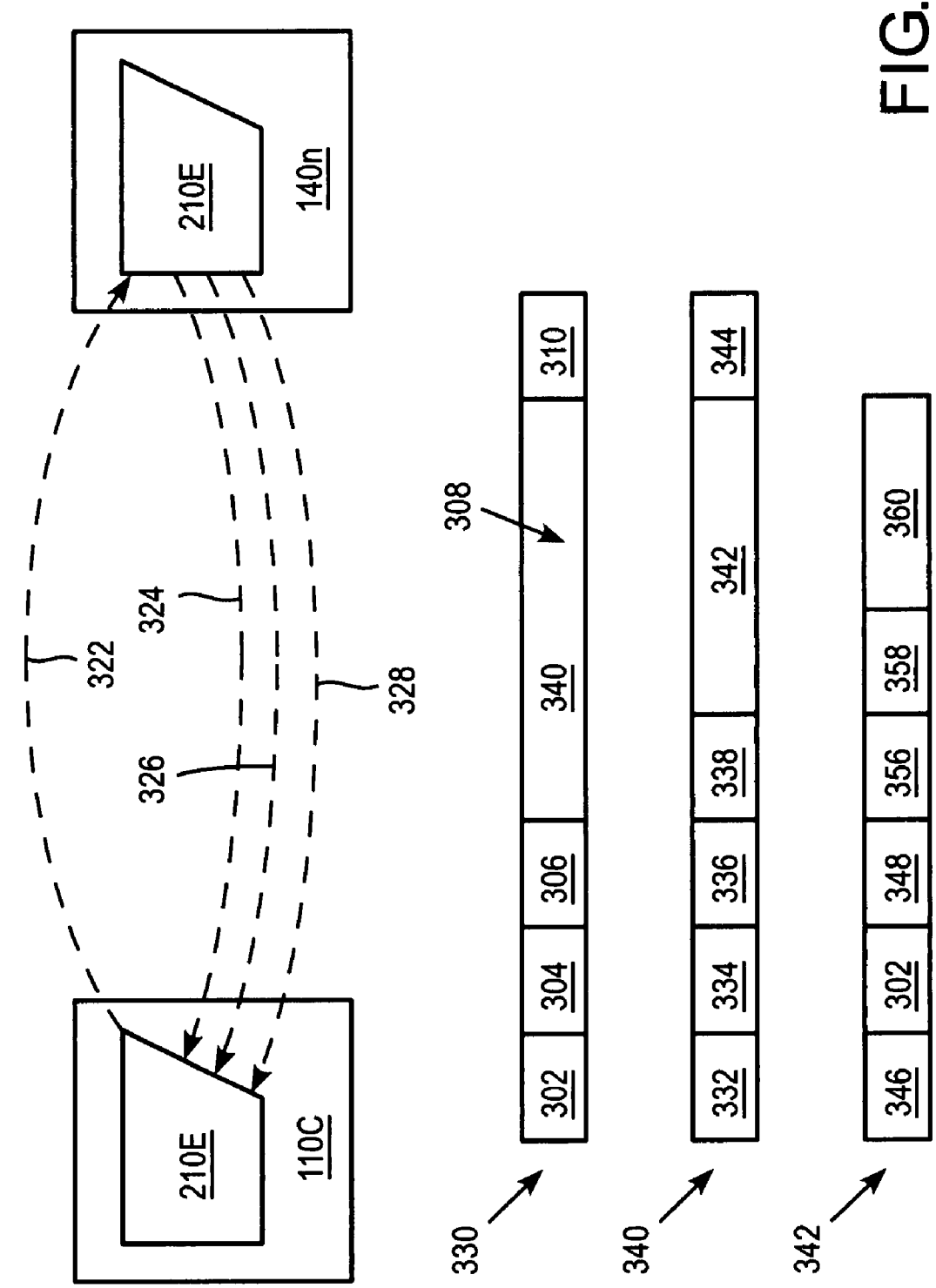

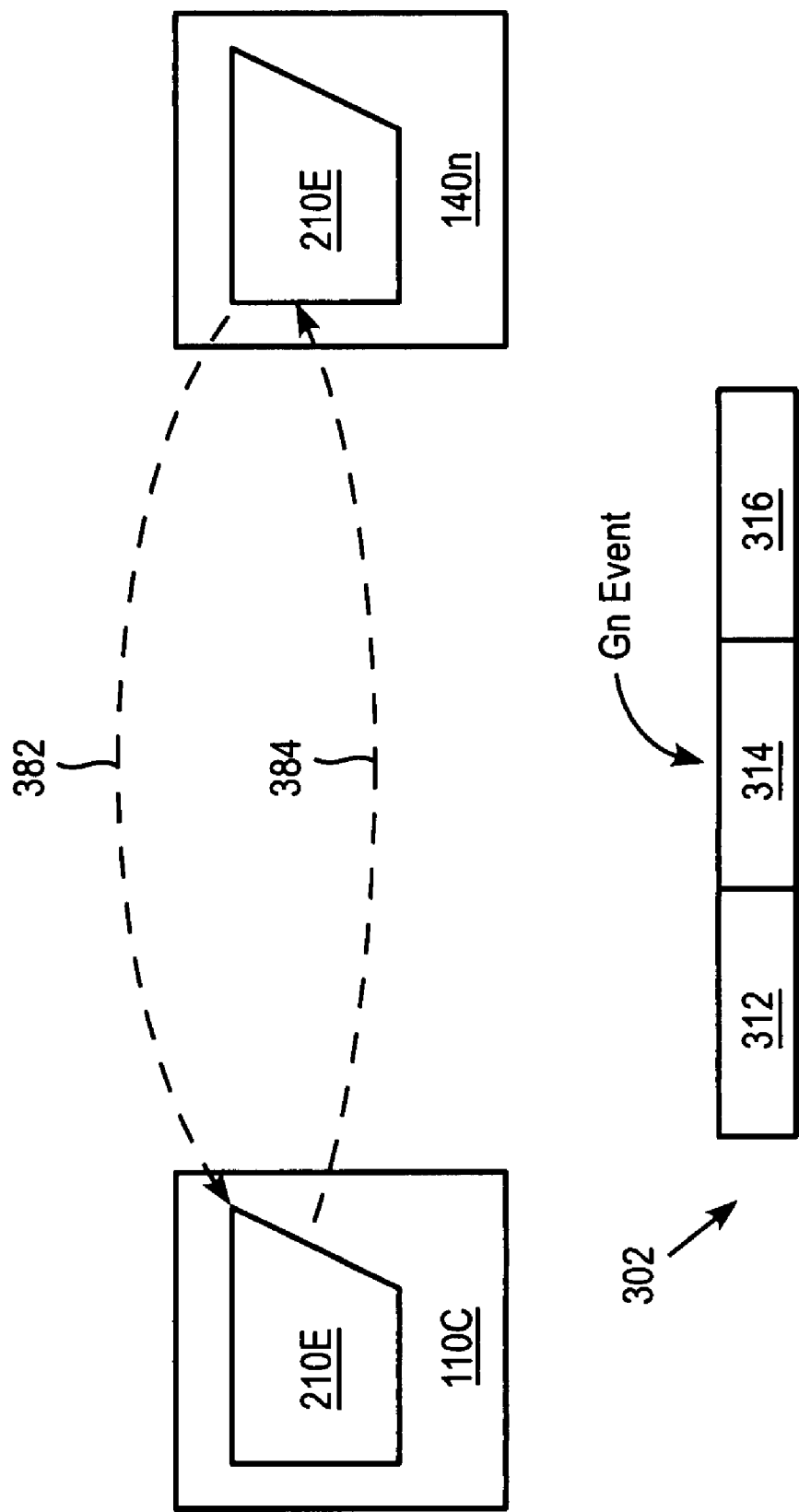

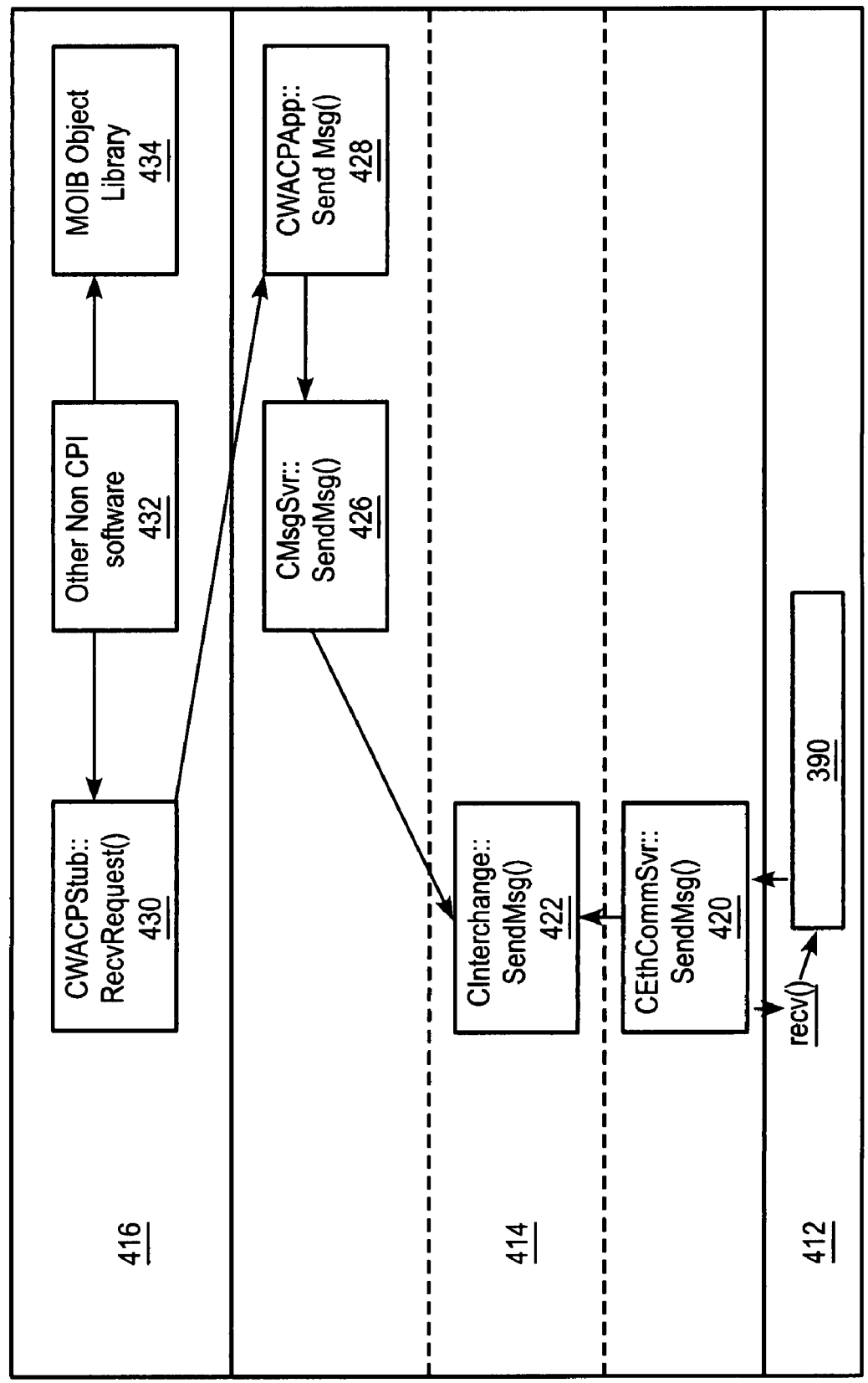

```
<?xml version="1.0" encoding="ISO-8859-1" ?>              — 612
- <DDS_DEMO>              — 614
  + <FAMILY_NIBP>         — 616
  + <FAMILY_ERROR>        — 618
  + <FAMILY_BATTERY>      — 620
  + <FAMILY_DTCOLLECTION>
  + <FAMILY_WAVE>         — 622
  </DDS_DEMO>             — 624
```

FIG. 6B

```
<?xml version="1.0" encoding="ISO-8859-1" ?>
- <DDS_DEMO>
  - <FAMILY_NIBP>                                                                                         — 616
    + <SPECIES_KEY>                                                                                       — 630
632 —+ <CNIBPDSTD_DEFINITION class="CNIBPDStd" abrv="CNBPDSTD" version="105"
        family="FmNIBP" genus="GnDATA" species="SpSTANDARD">
634 —+ <CNIBPCSTD_DEFINITION class="CNIBPCStd" abrv="CNBPCSTD" version="102"
        family="FmNIBP" genus="GnCONFIG" species="SpSTANDARD">
636 —+ <MESSAGES>
     + <FAMILY_NIBP>                                                                                      — 638
618 —+ <FAMILY_ERROR>
620 —+ <FAMILY_BATTERY>
622 —+ <FAMILY_DTCOLLECTION>
624 —+ <FAMILY_WAVE>
     </DDS_DEMO>
```

FIG. 6C

```xml
<?xml version="1.0" encoding="ISO-8859-1" ?>
<DDS_DEMO>
 <FAMILY_NIBP>
  <SPECIES_KEY>
   <CNIBPDSTD_DEFINITION class="CNIBPDStd" abrv="CNBPDSTD" version="105"
    family="FmNIBP" genus="GnDATA" species="SpSTANDARD">
   <CNIBPCSTD_DEFINITION class="CNIBPCStd" abrv="CNBPCSTD" version="102"
    family="FmNIBP" genus="GnCONFIG" species="SpSTANDARD">
    <MESSAGES>
     <MSG type="Request" name="GET_BP" description="Get BP" />
     <MSG type="Request" name="GET_CONFIG" description="Get BP Config" />
     <MSG type="Response" name="PUT_BP" description="Put BP" />
     <MSG type="Response" name="PUT_CONFIG" description="Put BP Config" />
     <MSG type="Command" name="START_NIBP" description="Start BP Cycle" />
     <MSG type="Command" name="STOP_NIBP" description="Stop BP Cycle" />
     <MSG type="Command" name="WRITE_CONFIG" description="Write Config" />
     <MSG type="Status" name="REPORT_BP" description="Report BP" />
    </MESSAGES>
  </FAMILY_NIBP>
  <FAMILY_ERROR>
  <FAMILY_BATTERY>
  <FAMILY_DTCOLLECTION>
  <FAMILY_WAVE>
</DDS_DEMO>
```

636 — <MESSAGES>
642a — <MSG type="Request" name="GET_BP"...
642b — <MSG type="Request" name="GET_CONFIG"...
642c — <MSG type="Response" name="PUT_BP"...
642d — <MSG type="Response" name="PUT_CONFIG"...
642e — <MSG type="Command" name="START_NIBP"...
642f — <MSG type="Command" name="STOP_NIBP"...
642g — <MSG type="Command" name="WRITE_CONFIG"...
642h — <MSG type="Status" name="REPORT_BP"...

FIG. 6D

```xml
<?xml version="1.0" encoding="ISO-8859-1" ?>
-<DDS_DEMO>
  -<FAMILY_NIBP>
    +<CNIBPDSTD_DEFINITION class="CNIBPDStd" abrv="CNBPDSTD" version="105"
       family="FmNIBP" genus="GnDATA" species="SpSTANDARD">
    -<CNIBPCSTD_DEFINITION class="CNIBPCStd" abrv="CNBPCSTD" version="102"
       family="FmNIBP" genus="GnCONFIG" species="SpSTANDARD">
      -<STATIC_MEMBERS>
        <VAR type="uint16" name="DisplayUnits" comment="Display units for BP and MAP" />
        <VAR type="boolean" name="MAPDisplay" comment="Map Display enabled/disabled" />
      </STATIC_MEMBERS>
      -<ENUMERATIONS>
        <ENUM type="DisplayUnits" name="NIBP_MMHG" defaultvalue="0" description="mmHg" />
        <ENUM type="DisplayUnits" name="NIBP_KPA" description="kPa" />
        <ENUM type="MAPDisplay" name="DISABLE" defaultvalue="0" description="MAP display disabled" />
        <ENUM type="MAPDisplay" name="ENABLE" description="MAP display enabled" />
        <ENUM type="Species" name="STANDARD" defaultvalue="0" description="NIBP Standard Configuration" />
      </ENUMERATIONS>
    </CNIBPCSTD_DEFINITION>
    +</MESSAGES>
  </FAMILY_NIBP>
  +<FAMILY_ERROR>

+<FAMILY_BATTERY>

+<FAMILY_DTCOLLECTION>
  +<FAMILY_WAVE>
</DDS_DEMO>
```

```xml
<?xml version="1.0" encoding="ISO-8859-1" ?>
- <DDS_DEMO>
  - <FAMILY_NIBP>  ─── 616
    <CNIBPDSTD_DEFINITION class="CNIBPDStd" abrv="CNBPDSTD" version="105"
      family="FmNIBP" genus="GnDATA" species="SpSTANDARD">
      <STATIC_MEMBERS>
        <VAR type="TIME" name="STime" comment="Time reading was taken" />
        <VAR type="uint16" name="Status" comment="DATA_NOT_AVAIL, DATA_AVAIL, etc" />
        <VAR type="int16" name="Systolic" comment="Systolic BP {in 0.01 mmHg units}" />
        <VAR type="int16" name="Diastolic" comment="Diastolic BP {in 0.01 mmHg units}" />
        <VAR type="int16" name="MAP" comment="Mean Arterial Pressure {in 0.01 mmHg units}" />
        <VAR type="uint16" name="HR" comment="NIBP Heart Rate (in BPM (Beats/Minute) units}" />
        <VAR type="uint16" name="ExtStatus" member="NUMERIC" />
        <VAR type="uint16" name="Source" comment="Source of data" />
        <VAR type="uint8" name="Mode" comment="Mode of operation" />
        <VAR type="uint8" name="Method" comment="Method used" />
      </STATIC_MEMBERS>
      <ENUMERATIONS>
        <ENUM type="Status" name="DATA_NOT_AVAIL" defaultvalue="0" description="Data Not Available" />
        <ENUM type="Status" name="DATA_COMPLETE" description="Data Available" />
        <ENUM type="Status" name="DATA_FAILURE" description="Data Failure" />
      </ENUMERATIONS>
    </CNIBPDSTD_DEFINITION>
  + <CNIBPCSTD_DEFINITION class="CNIBPCStd" abrv="CNBPCSTD" version="102"
      family="FmNIBP" genus="GnCONFIG" species="SpSTANDARD">
  + <MESSAGES>
  </FAMILY_NIBP>
  + <FAMILY_ERROR>
  + <FAMILY_BATTERY>
  + <FAMILY_DTCOLLECTION>
  + <FAMILY_WAVE>
</DDS_DEMO>
```

632 ──→ (CNIBPDSTD_DEFINITION line)
654 ──→ (STATIC_MEMBERS line)
660 ──→ (ENUMERATIONS line)

FIG. 6E

COMMUNICATION OF INFORMATION BETWEEN A PLURALITY OF NETWORK ELEMENTS

This application is a continuation-in-part of U.S. Non-Provisional patent application Ser. No. 11/663,395 filed Sep. 26, 2007 and titled "Communication of Information between a Plurality of Network Elements", which is a national stage application of PCT/US06/11373 filed Mar. 30, 2006 and titled "Communication of Information between a Plurality of Network Elements", which claims priority to U.S. Provisional Patent Application Ser. No. 60/667,203, filed Mar. 30, 2005 and titled "System for Configuring the Interoperable Behavior of Network Elements within a Medical Information System", and U.S. Provisional Patent Application Ser. No. 60/787,147 filed Mar. 28, 2006 and titled "System for Communicating Information between a Plurality of Network Elements". All of the aforementioned patent applications are herein incorporated by reference in their entireties.

FIELD OF THE INVENTION

This invention relates generally to methods, apparatus and systems for the communication of information among a plurality of network elements, and more specifically to a communications protocol interface and apparatus that may be configured to communicate a potentially large and varied set of defined data, including physiological and health care related data, between the plurality of network elements. An application generator program may implement the communications protocol from a set of extensible markup language (XML) data definitions.

BACKGROUND OF THE INVENTION

Varied computing environments may exist with vastly different requirements for acquisition, communication and storage of data depending on particular requirements of specific situations. In particular, some computing environments may require acquisition and communication of large volumes and varieties of data definitions. Furthermore, the requirements of many computing environments may change and evolve over time. An illustrative example of a computing environment that requires the acquisition and communication of large volumes and varieties of data definitions with requirements that change and evolve over time may be a health care computing environment. Other examples in other fields also require the acquisition and communication of large volumes and varieties of data definitions with requirements that change and evolve over time.

For example, a health care computing environment may include a variety of medical monitoring and analysis devices that process physiological data and communicate the physiological data via a network. The physiological data may include subsets of physiological data depending upon the application. For example, subsets of physiological data may include heart rate, respiration rate, blood pressure, and many other subsets of physiological data. The medical devices may include one or more types of software, and the medical devices and software may be configured to operate upon a particular subset of physiological data. The particular subset of physiological data may be unique to a group of one or more medical devices. There may also be an overlap between particular subsets of physiological data that are processed by each group of one or more medical devices.

The design of each medical device, or any other machine performing health assessment, is dependent upon the particular subset or subsets of physiological data that the medical device or other machine processes and communicates. The design of the software residing on the medical devices is also dependent upon the subset or subsets of physiological data or clinical outcomes that the medical device processes and communicates.

Electronic medical systems encompass devices and other clinical knowledge bases. Therefore, they must be capable of taking on the traits of highly adaptive, interpretive, and complex systems that continually evolve. As medical knowledge deepens there are changes in how medicine and medical practices are described. This may include physiology captured by devices as well as clinical analysis. It may be important that a method for defining and communicating medical information is extensible and flexible. This is also true of any other evolving or adapting environment.

As a result of the complexity found in medical electronic systems and other complex systems, a substantial effort may be required to design, implement and maintain software that acquires and communicates physiological and/or other types of similar data. Over time the effort to design, implement and maintain this software is both cost and labor intensive. Additional substantial effort may be required when the software is developed to execute on a plurality of interoperating devices, with the plurality of devices operating upon unique and/or particular subsets of data. The software may then be required to operate on multiple subsets of data characterized by distinct data types and associated data definitions. Substantial effort may also be required where the data, including the data types and associated data definitions, may be subject to change and evolve over time. Substantial effort may also be required where the data, including the data types and associated data definitions differentiate from one device to the next due to targeted clinical use or level of user.

Software reliability may be critical in a variety of fields, but is particularly critical to providing adequate health care. Therefore, substantial efforts are required where software operates upon data within a health care environment. Lack of reliable software interoperability within a health care environment may interfere with providing adequate health care and may harm or even kill health care patients.

Needs exist for improved communications protocols for acquisition and communication of data between network elements.

SUMMARY OF THE INVENTION

Embodiments of the present invention may solve many of the problems and/or overcome many of the drawbacks and disadvantages of the prior art by providing a method, apparatus and system for communicating information among a plurality of network elements, and more specifically by providing a communications protocol configured to communicate a potentially large and varied set of defined data, including physiological and health care related data, between the plurality of network elements, as well as providing information plug and play regardless of data evolution in a complex and continually adapting environment.

Embodiments of the present invention may include a communications protocol based upon an underlying data classification system including four main features defined as a Medical Object Information Base herein ("MOIB"), a Medical Object Management Protocol ("MOMP"), an Interchange protocol, and a Rendezvous Protocol.

MOIB and MOMP may be specifications of a computer language used to define information symbols and message rules. Inherent in these two protocols may be the use of a semantic model that defines grammar or rules (defined in MOMP) used to build common sentence structures as well as machine information models (defined in MOIB) representing the information machines communicate. The protocol may be modeled in this way so that each device may be capable of intelligent and open communications regardless of the transport or communications pipe used.

MOIB and MOMP may generally define a computer language modeled after human language. An open system of communications may be enabled when message constructs are common to all constituents in a system. As an example, imagine the interaction between two individuals in which one individual asks another for information. The simple ability to ask for information and comprehend a request is the result of training in the construction of sentences using the rules of grammar. The end result may be a response with the information requested or a response acknowledging a lack of awareness of the information requested. MOIB and MOMP provide the basis for machine dialogue to facilitate information interoperability by separating a predicate (MOMP) from a subject (MOIB) such that machines can process dialogue intelligently and openly.

Machines in networks using the rules defined by MOMP may communicate openly with other constituent members and exchange intelligent answers even if subjects are not recognized. A goal of MOMP may be to provide rules of language engagement for all constituents in a network to use during communication.

The symbols (MOIB) may define an information subject of the intended function of the machine. For example, a main function of a medical device may be the definition of information specific to human physiology, clinical outcomes and interpretation, abstracted from the hardware or other process retrieving data. Once a physiologic classification is complete, it the classification may be applied to MOIB. As discussed, MOIB may be the specification defining physiology or any information model in an electronic form.

The combination of the MOMP and MOIB specifications may allow the electronic exchange of data in intelligent dialogue.

The Interchange specification may provide an enveloping mechanism for messages and data passed between constituent members in a system. The Interchange specification may also track with whom the device is conversing. Similar to the addressing scheme used in the postal system the Interchange specification may be a mechanism for tracking where a message comes from so the response is directed to the right place. The Interchange specification may work like a physical post office dispatching mail to the proper location sources using addresses and may be used on any transport or media.

Rendezvous may be a handshaking protocol that provides a process that first identifies that the device supports MOMP, MOIB, and Interchange via a simple string followed by an optional negotiation of encryption keys.

Embodiments of the present invention may overcome the drawbacks of existing systems and methods by providing a computer-readable medium carrying one or more sequences of instructions for controlling communications between one or more network devices, which instructions, when executed by one or more processors, cause the one or more processors to carry out the steps of: transferring a communication through an upper protocol stack wherein the upper protocol stack is operable by application software, transferring the communication through an interchange layer between the upper protocol stack and a lower protocol stack, transferring the communication through the lower protocol stack wherein the lower protocol stack is operable by operating system software, wherein the upper protocol stack comprises one or more of a data transfer protocol, and wherein the data transfer protocol processes communications based upon values found in classification fields within the communication.

In embodiments of the present invention the upper protocol stack and the lower protocol stack may be implemented by a host computer or a remote access device. The upper protocol stack may further include a link management protocol where the link management protocol establishes and terminates connections between the one or more network devices.

Embodiments of the present invention may include receiving the communication at the upper protocol stack from an application layer and/or receiving the communication at the lower protocol stack from a network device.

In embodiments of the present invention the classification fields may include a first classification field identifying a particular software module within the data transfer protocol having an associated set of message and information types, a second classification field identifying a set of one or more attributes of the first classification field, and/or a third classification field identifying a set of one or more additional attributes of the software module identified by the first classification field and the one or more attributes identified by the second classification field.

Embodiments of the present invention may also include a method of establishing a communications connection between network devices including creating an interchange envelope comprising a connection request at a first network device, transmitting the interchange envelope to a second network device, receiving a response to the connection request from the second network device, creating an encryption key request for the second network device, transmitting the encryption key request to the second network device, receiving an encryption key in response to the encryption key request, creating a start communication protocol process request for the second network device, transmitting the start communication protocol process request to the second network device, receiving a host ready communication in response to the start communication protocol process, and wherein each request and response is classified and processed based upon a first classification sub-field, a second classification sub-field, and a third classification sub-field within each request and response.

In embodiments of the present invention control may be passed to a communication protocol process operating on the first network device. The communications connection may be terminated upon receiving a termination communication at the first network device.

Embodiments of the present invention may include a communications protocol interface stored in a tangible medium and implemented by one or more processors including application software, operating system software for implementing a lower protocol stack one or more extensible software modules interfacing with the application software and one or more core software modules, wherein the one or more core software modules interface with the one or more extensible software modules, the application software and the operating system software, wherein the one or more extensible software modules and the one or more core software modules implement an upper protocol stack wherein the processing and delivery of a communication is performed according to a classification hierarchy within the communication, wherein the one or more core software modules implement standardized functionality, and wherein the one or more extensible software modules implement supplemental and customizable functionality.

The standardized functionality may be selected from the group consisting of connection establishment, connection termination, encryption, generic message types, and combinations thereof. The one or more extensible software modules may be defined by data definitions.

Embodiments of the present invention may also include a computer-readable medium carrying one or more sequences of instructions for controlling communications between one or more network devices, which instructions, when executed by one or more processors, cause the one or more processors to carry out the steps of: receiving a communication from a network device, passing the communication through a data management protocol, classifying the communication while in the data management protocol based upon a data classification within the communication, passing data from the classified communication to application software for processing, preparing a reply to the communication in the application software, passing the reply from the application software through the data management protocol, classifying the reply while in the data management protocol based upon a data classification within the reply, and sending the reply to the network device.

Embodiments of the present invention may also include a communication protocol system including a host computer, a network link at the host computer for communicating between the host computer and one or more network devices, a database in communication with the host computer for storing data from the host computer, communications protocol software on the host computer for processing communications between the host computer and the one or more network devices, wherein the communications protocol software comprises an upper protocol stack operable by application software and a lower protocol stack operable by the operating system software, and wherein the upper protocol stack processes communications based upon values found in hierarchal classification fields within the communication.

Embodiments of the present invention may include one or more additional host computers in communication with the host computer. The communicating between the host computer and the one or more additional host computers may be via Ethernet or the Internet. The one or more network devices may be medical devices. WiFi gateways may exist between the host computer and the one or more network devices. The communicating between the host computer and the one or more network devices may be performed by connections selected from the group consisting of WiFi, serial, USB and combinations thereof. Communications from the one or more network devices may be received in a format compatible with the communications protocol software. The communications from the one or more network devices contain values corresponding to the first classification, the second classification and the third classification. The database may store and process data captured and processed by the host computer from the one or more network devices.

Embodiments of the present invention may include a method of communicating between network devices including transmitting a request communication, wherein the request communication comprises a first classification, a second classification, and a third classification, the first classification identifying a module having an associated set of message types, the second classification identifying a set of one or more attributes of the first classification, and the third classification identifying a set of one or more additional attributes of the module identified by the first classification and the one or more attributes identified by the second classification, receiving a response to the request communication comprising values corresponding to the first classification, the second classification and the third classification.

Embodiments of the present invention may include a data classification system including one or more fields within a message, one or more sub-fields within at least one of the one or more fields, values within the one or more sub-fields, wherein the one or more sub-fields each represent one or more tiers of a classification scheme, and wherein the message is processed based upon the values within the one or more sub-fields.

Embodiments of the present invention may also include a network communications protocol including one or more sets of code instructions, one or more data definitions created from the one or more sets of code instructions, a communication format defined by the data definitions for passing a communication between network devices, wherein the communication format incorporates data organized by the data definitions, and wherein the data definition contains a tiered classification system comprising a first classification identifying a particular software module for processing the communication format having an associated set of message types, a second classification identifying a set of one or more attributes of the first classification, and a third classification identifying a set of one or more additional attributes of the software module identified by the first classification and the one or more attributes identified by the second classification.

Embodiments of the present invention may include an interchange envelope sent, received or transmitted by a network device and processed by one or more processors on the network device including a data buffer field for storing data included within the interchange envelope, a message within the data buffer field, a message identifier field within the message comprising a set of values for identifying and classifying the type of message, and wherein the set of values for identifying and classifying the type of message comprises a first sub-field, a second sub-field, and a third sub-field each representing one level of hierarchal classification for the message.

Embodiments of the present invention may include a session preamble field where the session preamble field delimits a structure of the interchange envelope with a unique sequence of binary values, a packet length field where the packet length field indicates the length of the entire interchange envelope, a port/application identifier field where the port/application identifier field identifies a port number associated with an application type, a header cyclic redundancy check field where the header cyclic redundancy check field stores a cyclic redundancy check value computed for the interchange envelope.

In embodiments of the present invention the message may further include a message identifier field, a message size field, a message encryption field, an object buffer field, an a cyclic redundancy check field, where the message size field indicates the length of the entire message, the message encryption field comprises values that indicate the presence and type of encryption of the message, the object buffer field stores data that represents a serialized object, and the cyclic redundancy check field stores a cyclic redundancy check value computed for the message.

Embodiments of the present invention may include a sequence number field, a universal unique identifier field, and a data length field, where the sequence number field stores a unique identifier for each portion of the interchange envelope when the interchange envelope is divided into portions in response to limited buffer capacity, the universal unique identifier field stores an identifier for the interchange envelope, and the data length field stores a length of the data buffer field.

Embodiments of the present invention may include a software generator program stored on a computer readable medium, wherein processors execute the following steps including receiving a data dictionary corresponding to a network device and its device data sheet wherein the device data sheet comprises data definitions structured as a three-tiered classification system, accessing a code framework organized based upon the data definitions in the data dictionary, compiling and generating a source code module based upon the code framework to represent the data definitions as object files, and outputting the source code module.

In embodiments of the present invention the outputted source code module may be integrated with a communications interface. The outputted source code module may be compiled and linked to an existing set of core source code files. The outputted source code module may be compiled and linked to an existing set of newly created source code files or to an existing set of core source code files and an existing set of newly created source code files. A sub-set of the source code modules may be selected for use on a specific network device.

Embodiments of the present invention may include a collection of compiled and linked modules of source code modules where the collection is dynamically linked or statically linked.

Embodiments of the present invention may include a method of creating customizable communications protocols including identifying a communications protocol interface for a particular application, encoding the communications protocol interface as an extensible data definition defining one or more modules of functionality, transferring the extensible data definition to an application generator program, receiving extensible software from the application generator program, and combining the extensible software with pre-existing core software and pre-existing extensible software for creating a communications software module implementing the communications protocol interface.

Embodiments of the present invention may further include installing the communications software module onto one or more network devices, modifying the communications protocol interface, and/or revising the extensible data definition and repeating the steps beginning with inputting the extensible data definition into the application generator program through installing the communications software module onto one or more network devices.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 2D is a block diagram illustrating a structure of information output from an interchange layer when transmitting from a communications interface.

FIG. 3A-1 is a block diagram illustrating a reference taxonomy used to define the communications model of a device in MOMP and MOIB terms.

FIG. 3A-2 is an embodiment of the MOMP taxonomy for a set of example physiologies.

FIG. 3A-3 represents the embodiment of the taxonomic signatures for an example physiologic module with both MOMP and MOIB represented.

FIG. 3A-4 represents the embodiment of the combination of predicates MOMP signatures with MOIB subject signatures to create a sentence.

FIG. 3A-5 represents the embodiment of the taxonomy of the error module.

FIG. 3A-6 represents the embodiment of the combination of predicate MOMP signatures with MOIB subject signatures to create a standard request sentence and well as the potential message path following.

FIG. 3A-7 represents the embodiment of the combination of predicate MOMP signatures with MOIB subject signatures to create a standard write command sentence as well as the potential message path following.

FIG. 3A-8 represents the embodiment of the combination of predicate MOMP signatures with MOIB subject signatures to create a standard execute command sentence as well as the potential message path following.

FIG. 3A-9 represents the embodiment of the combination of predicate MOMP signatures with MOIB subject signatures to create a standard report sentence as well as the potential message path following.

FIG. 3A-10 represents the embodiment of the combination of predicate MOMP signatures with MOIB subject signatures to create a standard stream sentence.

FIG. 3A-11 is an embodiment of the MOIB taxonomy for a set of example physiology.

FIG. 3A-12 is a block diagram illustrating a structure of the information that constitutes a medical object information base (MOIB) message.

FIG. 3B is a block diagram illustrating an MOMP message exchange between a host device and a VSMD including a request type of MOMP message.

FIG. 3E is a block diagram illustrating an MOMP message exchange between a host device and a VSMD including an event type of MOMP message.

FIG. 4C is a block diagram that illustrates a path of execution through an embodiment of communications protocol interface software that transmits a response type message in response to receiving the request type message of FIG. 4A.

FIG. 6A illustrates a set of data definitions that define a plurality of extended modules and that are encoded in Extensible Markup Language (XML).

FIG. 6B illustrates the set of data definitions of FIG. 6A including XML element tags that are nested one level below the <FAMILY_NIBP>element.

FIG. 6C illustrates XML element tags that are located one level below the <MESSAGES>element of the <FAMILY_NIBP>element of the set of data definitions of FIG. 6A.

FIG. 6D illustrates XML element tags that are located one level below the <CNIBPCSTD_DEFINITION>element of the <FAMILY_NIBP>element of the set of data definitions of FIG. 6A.

FIG. 6E illustrates some of the XML element tags that are located one level below the <CNIBPDSTD_DEFINITION>element of the <FAMILY_NIBP>element of the set of data definitions of FIG. 6A.

DETAILED DESCRIPTION OF THE PREFERRED EMBODIMENTS

Figure 1:
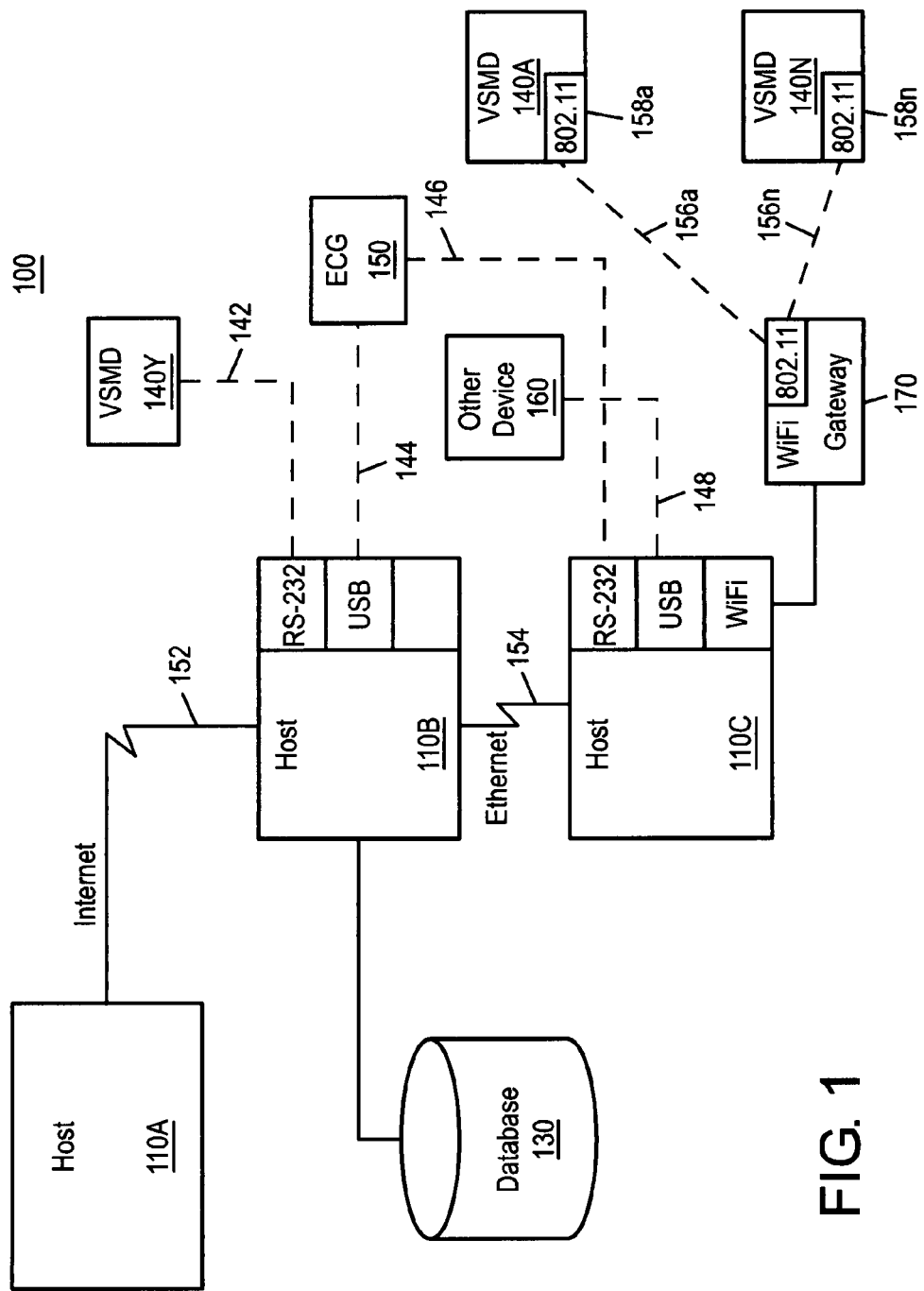
FIG. 1 is a block diagram illustrating various network elements located within health care or medical information system and is not exhaustive in terms of more extensive embodiments of network topology either anticipated or unanticipated.

FIG. 1 is a block diagram illustrating various network elements located within health care and/or medical information system 100. Embodiments of the present invention may be used with any types of information systems. A health care and/or medical information system 100 is chosen as an exemplary system. Network elements may include host or server computers 110A-110C, vital signs measuring devices (VSMDs) 140A-140Y, electrocardiogram (ECG) devices 150 and/or other devices 160. The various network elements may constitute nodes within the health care and/or medical information system 100. The various network elements may perform a variety of different functions within the health care and/or medical information system 100.

The host or server computers 110A-110C may be stationary or non-mobile devices that accommodate a variety of optional hardware. Optional hardware may include hard disk drives, RAM memory cards and/or communication interface hardware to support Ethernet, WIFI, USB, serial communications interfaces, and any other communication interface hardware for communications between the host or server computers 110A-110C and other network elements. One who is skilled in the art will recognize that hard disk drives and RAM memory cards are examples of non-transitory computer-readable storage media.

VSMDs 140A-140Y may be network elements used by operators to perform various vital sign related physiological measurements of a patient. For example, a VSMD 140A-140Y may measure systolic and diastolic pressure, mean arterial pressure, pulse rate, temperature and/or pulse oximetry (SpO2) of adult and/or pediatric patients. A VSMD 140A-140Y may communicate with other network devices, including a host or server computer 110A-110C via an RS-232 serial interface, a universal serial bus (USB) interface or WiFi wireless 802.11 communications interfaces.

In an embodiment of the present invention, a VSMD 140A or 140N may be a Welch Allyn Spot LXi VSMD. In this embodiment, the VSMD 140A or 140N may optionally use a wireless adapter 158a or 158n to wirelessly communicate via an 802.11 communications channel 156a or 156n. The communications channel 156a or 156n may connect the VSMD 140A or 140N to a WiFi gateway 170, and the WiFi gateway 170 may then communicate with another network element, for example containing a WiFi communications interface. For example, the VSMD 140A or 140N may communicate with a host or server computer 110C via the WiFi gateway 170. A VSMD 140Y may communicate 142 via an RS-232 serial communications channel to a host or server computer 110B.

Other devices, such as an ECG measurement device 150, may communicate 144 via a USB communications channel to a host or server computer 110B or may communicate 146 via an RS-232 serial communications channel to a host or server computer 110C. As shown in FIG. 1, another device 160 may communicate 148 via a USB communications channel to a host or server computer 110C.

The host or server computer 110B may also communicate with a remotely located host computer 110A via an Internet communications channel 152. The host or server computer 110B may also communicate with another host or server computer 110C via an Ethernet local area network communications channel 154. The host or server computers 110A-110C may be set up and connected in various configurations with various networking connections. The host or server computer 110B may be directly connected to a database 130 that functions as a repository of data. The database 130 may store and process data captured and processed by the health care and/or medical information system 100. Data from the health care and/or medical information system 100 may be defined and structured to represent numerous measurements of human physiology for a population of patients and is subject to evolve over time.

Figure 2A:
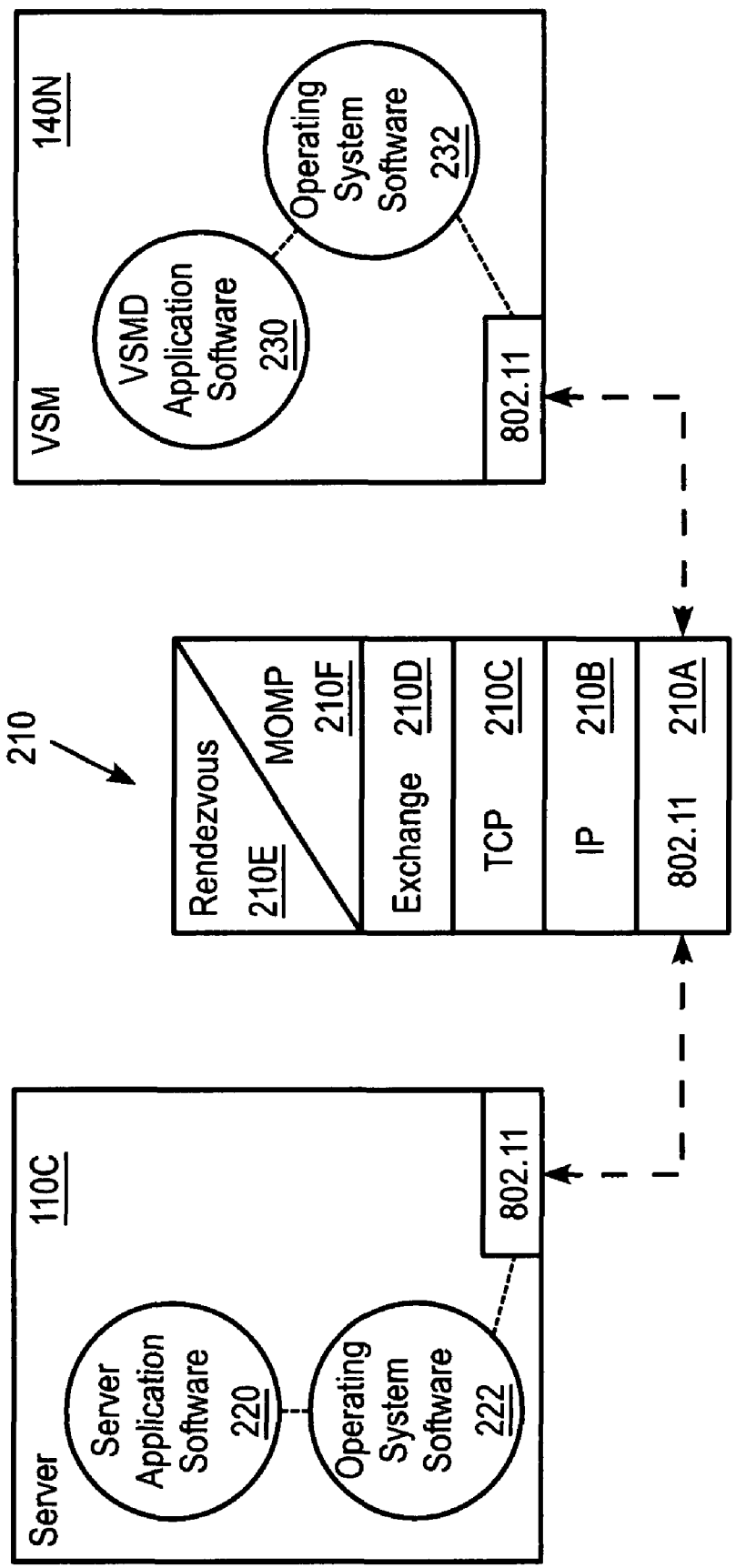
FIG. 2A is a block diagram illustrating a representation of internal software components and a communications protocol interface residing within a vital sign measuring device (VSMD) and a host or server computer as show in FIG. 1.

FIG. 2A is a block diagram illustrating a representation of internal software components and a communications protocol interface 210 residing within the VSMD 140N and the host or server computer 110C, as shown in FIG. 1.

A communications protocol interface 210, also referred to herein as a protocol stack, may include a layering or stack of communications protocols 210A-210F. The communications protocol interface 210 may be exercised between the VSMD 140N and the host or server computer 110C. Each communications protocol 210A-210F may be implemented as executing software within the communications protocol interface 210 for each network element. Each communications protocol 210A-210F may assist with the communication of information, including data that is acquired, stored and processed, by each network element of the health care and/or medical information system 100.

Each communications protocol 210A-210F may operate in accordance with a communications protocol interface (CPI) specification (not shown), also referred to herein as a CPI specification or communication interface specification. The CPI specification may be a tangible description of a communications interface. The communications interface is also referred to herein as a communications protocol interface (CPI). The CPI specification may be written, printed, digitally encoded, or other wise tangibly described and provides the ability to create standard MOMP messages recognizable by all constituents in the MOMP network.

The communications interface 210 may include a series of communication protocols 210A-210F. The lower three protocol layers 210A-210C may be exemplary. Protocol layer 802.11 210A, internet protocol (IP) 210B and transport connection protocol (TCP) 210C may be standard and well-known communications protocols that collectively constitute a lower portion of the protocol stack 210. The lower three protocol layers 210A-210C are also referred to herein as a lower protocol stack. The lower three protocol layers 210A-210C may be employed to support and carry the upper protocol layers 210C-210F. Protocol layers such as Interchange 210D, Rendezvous 210E and medical object management protocol (MOMP) 210F protocol layers are described in accordance with embodiments of the present invention.

Use of the lower protocol stack 210A-210C as described above may not be required, and may be modified in various ways to practice embodiments of the present invention. Other communications protocols, or combinations of communications protocols, can be substituted and/or combined with the communications protocols 210A-210C in various ways to support and carry the upper protocol layers 210D-210F.

The Interchange protocol layer 210D, also referred to herein as the Exchange layer or Interchange layer, may reside on a session layer of the Open Systems Interconnection (OSI) reference model and is preferably employed to carry the Rendezvous protocol layer 210E or the MOMP protocol layer 210F. The OSI reference model is a layered, abstract description for communications and computer network protocol design, developed as part of the Open Systems Interconnection initiative. The OSI model divides the functions of a protocol into a series of layers. Each layer preferably has the property that it only uses the functions of the layer below, and only exports functionality to the layer above. A system that implements protocol behavior consisting of a series of these layers is known as a protocol stack or simply a stack. Protocol stacks can be implemented either in hardware or software, or a mixture of both. Typically, only the lower layers are implemented in hardware, with the higher layers being implemented in software. This OSI model is roughly adhered to in the computing and networking industry. Its main feature is in the interface between layers which dictates the specifications on how one layer interacts with another.

Server application software 220 may be located on the host computer 110C. The server application software may be configured to implement the upper protocol stack 210D-210F. Operating system software 222 may be located on the host computer 110C. The operating system software 222 may be configured to implement the lower protocol stack 210A-210C Likewise, VSMD application software 230 may be located on the VSMD 140N. The VSMD application software 230 may be configured to implement the upper protocol stack 210D-210F. Operating system software 232 may be located on the VSMD 140N and may be configured to implement the lower protocol stack 210A-210C. Other network elements may implement the protocol stack 210 in a same manner as described above.

Figure 2C:
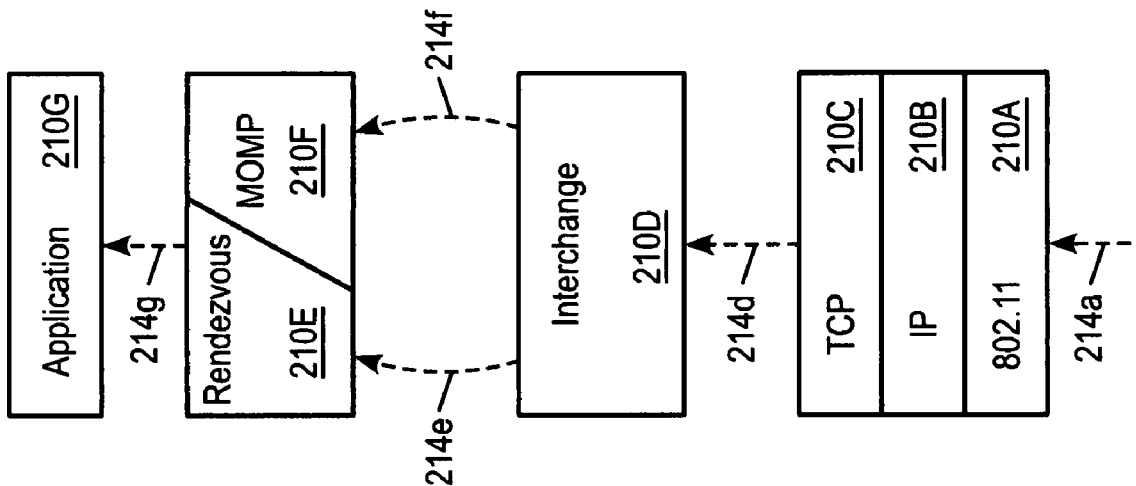
FIG. 2C is a block diagram illustrating receiving information through a communications interface.
Figure 2B:
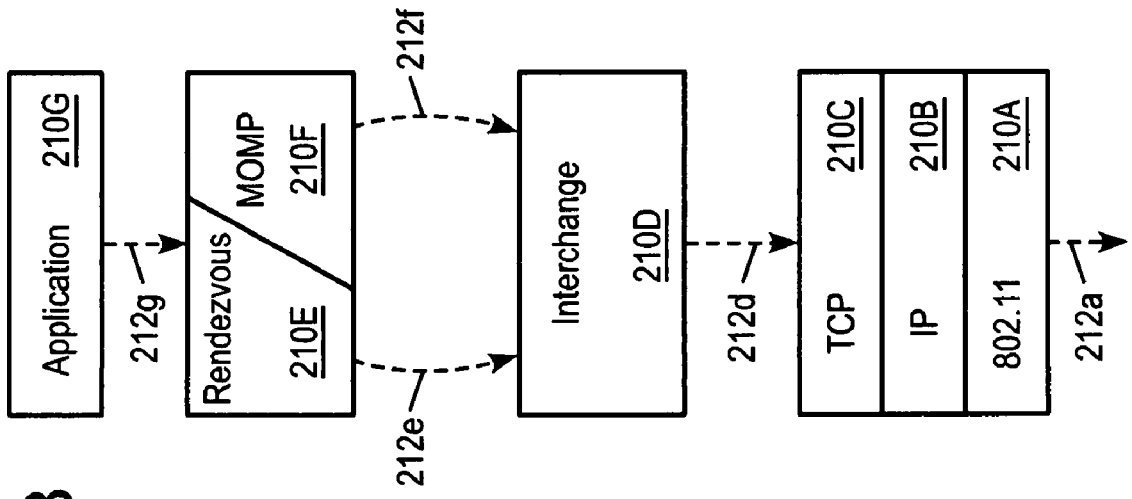
FIG. 2B is a bock diagram illustrating receiving information from a network element through the communications interface.

FIG. 2B is a block diagram that illustrates transmitting information from a first network element to a second network element through the communications interface 210. When employing the communications interface 210 to transmit information, an Application layer 210G may initiate a transfer of information 212g, typically in the form of function call parameters, to either the Rendezvous 210E or the MOMP 210F protocol layers. The Rendezvous 210E or the MOMP 210F protocol layers may receive information in the form of MOIB depending on the particular circumstances of the information transfer.

In embodiments of the present invention, a function call parameter may include a pointer to a buffer of information in some form of MOIB to be transmitted via the communications interface 210. The next receiving protocol layer may transfer information to the Interchange layer 210D. Preferably, either the Rendezvous 210E may transfer 212e information to the Interchange layer 210D or the MOMP 210F protocol layer, may transfer information 212f to the Interchange layer 210D.

The information 212e or 212f may be input into the Interchange layer 210D from either from the Rendezvous 210E or the MOMP 210F protocol layers, respectively. The information input 212e from the Rendezvous 210E layer is preferably related to establishment or termination of a connection with the second network element. The information input 212f from the MOMP 210E layer is preferably related to intelligent dialog, based on rules of language engagement as defined by the MOMP protocol standard, with the second network element that was previously established by the Rendezvous 210E layer.

The interchange layer 210D may accept the inputted information 212e or 212f and then may output information 212d to the lower protocol stack 210A-210C. The information transfer 212d may be structured as an Interchange envelope that surrounds and includes either the information 212e from the Rendezvous protocol layer 210E or the information 212f from the MOMP protocol layer. For example, information transfer 212d to the lower protocol stack 210A-210C may include the information 212e when the information 212e is received and processed by the Interchange layer 212D, or may include the information 212f when the information 212f is received and processed by the Interchange layer 210D.

The lower protocol stack 210A-210C may accept the inputted information 212d and then may output information 212a for communication via a communications channel (not shown) to the second network element. The information 212a may include the information 212d in addition to protocol information added by software implementing the lower protocol stack 210A-210C.

FIG. 2C is a block diagram that illustrates receiving information at a first network element from a second network element through the communications interface 210. The lower protocol stack 210A-210C may accept inputted information 214a transmitted from the second network element via a communication channel and related hardware (not shown). The lower protocol stack 210A-210C may process the information 214a and may then output information 214d to the Interchange layer 210D.

The Interchange layer 210D may accept and process the information 214d, and may then output or route information 214e to the Rendezvous layer 210E or information 214f to the MOMP layer 210F. The routing of the information 214e or 214f preferably depends upon whether the information 214d is destined for the Rendezvous layer 210E or the MOMP layer 210F. The information transfer 214*d* may be structured as an Interchange envelope that surrounds and includes information addressed to either the Rendezvous layer 210E or the MOMP layer 210F. The Interchange layer 210D may remove information constituting the Interchange envelope.

The Rendezvous 210E and the MOMP 210F protocol layers may each input and process information received from the Interchange protocol layer 210D. Either the Rendezvous protocol layers 210E or the MOMP protocol layer 210F may output or route MOIB information to the Application layer 210G.

FIG. 2D is a block diagram illustrating a possible structure 220 of the information 212*d* that is output from the interchange layer 210D when transmitting from the communications interface 210. The structure 220 may also be referred to herein as a large version of an Interchange envelope 220, session envelope 220, or a session wrapper 220 capable of transferring information in segments when the information is too large to send in one envelope. The structure 220 may be divided into a plurality of portions or fields. The fields may include a session preamble field 222, a packet length field 224, a port/application identifier field 226, a sequence number field 228, a universal unique identifier (UUID) field 230, a data buffer field 234, and a header cyclic redundancy check (CRC field 236.

The session preamble field 222 may be configured to define the structure 220 of the information 212*d*. The session preamble field 22 may include a unique sequence of binary values. The packet length field 224 may indicate the length of the entire structure 220 of the information 212*d* in units of bytes. The port/application identifier field 226 may identify a port number associated with an application type. The application type may identify a Rendezvous, MOMP or other application type. The sequence number field 228 may store a unique identifier for each portion of the structure 220 if the structure 220 is divided into portions due limited buffer capacity during communication of the structure 220. The UUID field 230 may store an identifier for the structure 220 so that another response communication received by the Interchange layer 210D can be associated with the structure 220. The data buffer field 234 may store data included within or carried by the structure 220. The CRC field 236 may store a cyclic redundancy check value computed for the entire structure 220.

A structure 240 may be a small version 240 of the Interchange envelope. The structure 240 may include a subset of the fields found in the large version of the structure 220. The small version of the structure 240 may contain similar fields to the large version of the structure 220 such as a session preamble field 222, a packet length field 224, a port/application identifier field 226, a data buffer field 234, and a header CRC field 236. Unlike the large version of the structure 220, the small version of the structure 240 may not contain the sequence number field 228, the UUID field 230, and the data length field 232.

The small version of the structure 240 may be employed by the Interchange layer 210D for information that is small enough to fit within the capacity of buffers employed across the connection while communicating the small version of the structure 240. In these circumstances, the small version of the structure 240 is does not need to be divided and sequenced into smaller portions that fit within one or more buffers of limited size residing between end points of the connection.

Figure 2E:
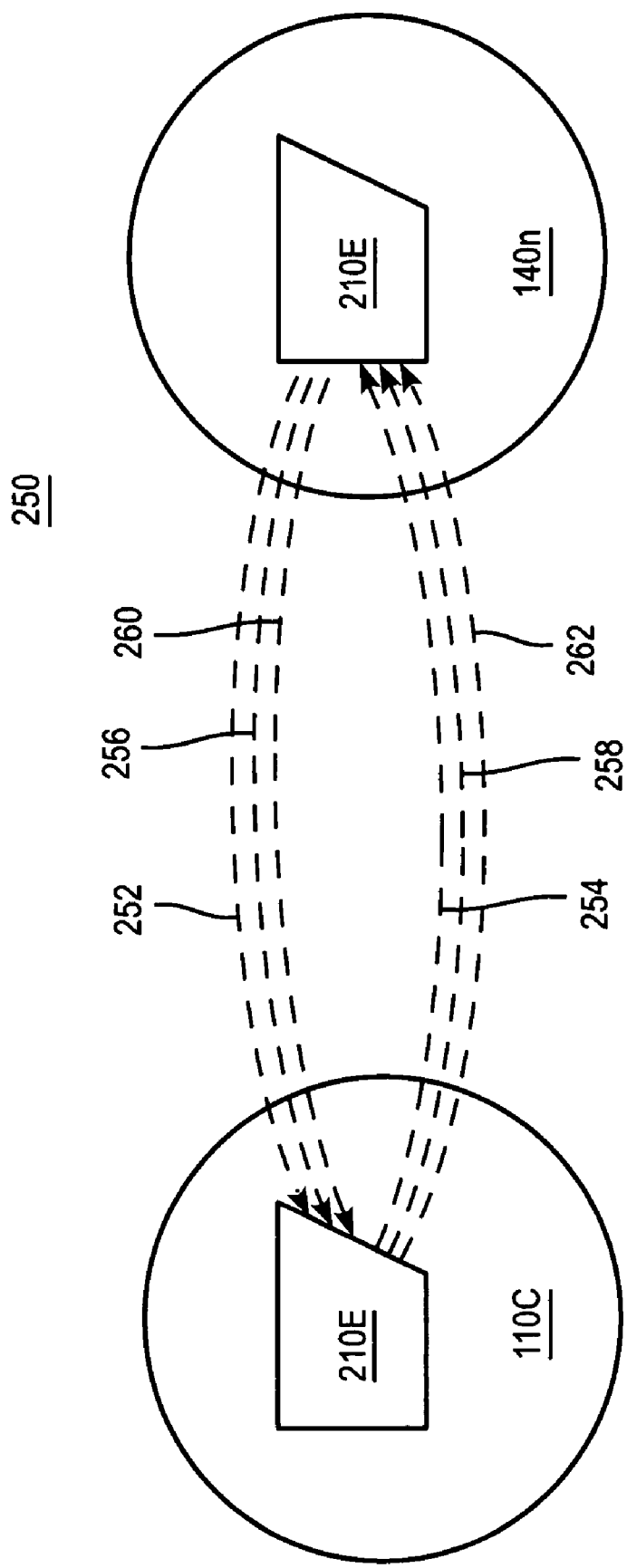
FIG. 2E is a block diagram illustrating an exchange of rendezvous protocol communications to establish a connection between a VSMD and a host network element.

FIG. 2E is a block diagram illustrating an exchange of a Rendezvous communications protocol to establish a connection between a VSMD 140N and a host or server computer 110C. To establish a connection, the Rendezvous protocol layer 210E may initiate a transmission of a connection request communication 252 that is addressed to the host or server computer 110C. The connection request communication 252 may be included within an Interchange envelope 220, 240 and transmitted from the VSMD 1040N to the host or server computer 110C via the Interchange protocol layer 210D and the lower protocol stack 210A-210C operating within the VSMD 140N. The data buffer field 234 of the Interchange envelope 220, 240 may carry an "RNDZConnect" string to identify it as a rendezvous protocol connection request message.

Software that implements the Rendezvous protocol layer 210E operating within the host or server computer 110C may receive the connection request communication 252 via the lower protocol stack 210A-210C and the Interchange protocol layer 210D that are operating within the host or server computer 110G. The port/application identifier field 226 may indicate the Rendezvous protocol layer 210E as the application type addressed by the connection request communication 252. The host or server computer 110C may be addressed via the lower protocol stack 210A-210C.

Next, the host or server computer 110C may transmit a connection accept communication 254 to the VSMD 140N. The connection accept communication 254 may be included within an Interchange envelope 220, 240 and transmitted from the host or server computer 110C to the VSMD 140N via the Interchange protocol layer 210D and the lower protocol stack 210A-210G. The connection accept communication 254 may be implemented by software operating within the host or server computer 110G. The software operating within the host or server computer 110C and implementing the Rendezvous protocol layer 210E may receive the connection accept communication 254 via the lower protocol stack 210A-210C and the Interchange protocol layer 210D that are operating within the VSMD 140N. The port/application identifier field 226 of the connection accept communication 254 may indicate the Rendezvous protocol layer 210E as the application type addressed by the connection accept communication 254.

A rendezvous connection may be established after the receipt of the connection accept communication 254. The VSMD 140N may then transmit an encryption key request communication 256 to the host or server computer 110C. The host or server computer 110C may respond to the encryption key request communication 256 by transmitting an encryption key communication 258 that includes an encryption key, also referred to as a session key, to the VSMD 140N.

Upon receiving the encryption key, the VSMD 140N may transmit a start process command with a GUID encased representing the MOIB information model of the connecting device 260 to the host or server computer 110C. The host or server computer 110C may respond to the start process request communication 260 by executing an instance of a communications protocol process and transmitting a host ready communication 262 to the VSMD 140N with a GUID representing the MOIB information data model of the host. The VSMD 140N may receive the host ready communication 262 and may transfer control of the communication process to a communications protocol process operating within the VSMD 140N.

The Rendezvous connection may terminate when a Rendezvous connection termination communication is transmitted by the host or server computer 110C to the VSMD 140N. The exchange of communications between the VSMD 140N and the host or server computer 110C may be independent of the type of communications channel employed for communication between the VSMD 140N and the host or server computer 110C.

FIG. 3A and FIG. 3A-12 are block diagrams illustrating a structures of the information that constitutes a medical object management protocol (MOMP) message 300 and medical object information base (MOIB) object 3000. The MOMP message 300 may reside within and be carried by the data buffer field 234 of the Interchange protocol message 220, 240. The structure of the MOMP message 300 may be divided into a plurality of portions, referred to as fields. The fields may include a message identifier field 302, a message size field 304, a message encryption field 306, an object buffer field 308, and a cyclic redundancy check (CRC) field 310.

The message identifier field 302 may include a set of values for identifying and classifying the type of the MOMP message 300. The message size field 304 may indicate the length of the entire MOMP message 300, preferably in units of bytes. The message encryption field 306 may include values that indicate whether any encryption of the MOMP message 300 is being employed and if true, what type of encryption is being employed. The object buffer field 308 may store data that represents a serialized object. The serialized object can be a set of physiological MOIB data 3000 (see FIG. 3A-12) or other information acquired by a particular network element. The CRC field 310 may store a cyclic redundancy check (CRC) value computed for the entire structure 300.

The message identifier field 302 may further include sub-fields that each represents one type classification for the MOMP message 300. Preferably, each type classification represents one tier of a three tier classification scheme. Other numbers of tiers are possible.

The first sub-field 312 may store a value representing a first (highest tier) classification, also referred to herein as a family classification. The first classification can identify a particular module or information class having an associated set of physiological MOIB data 3000 and MOMP message types 300. The data can be physiological or other data types associated with, for example, blood pressure or other measurements. In an embodiment of the present invention the first classification may identify a module having an identifier equal to the text string "FAMILY_NIBP". The module may acquire and communicate a set of blood pressure related physiological MOIB data types. The identifier FAMILY_NIBP may be mapped to a unique value that is stored as the first classification for the MOMP message 300 that associated with the FAMILY_NIBP module. Other text string identifiers are used to identify modules other than the FAMILY_NIBP module.

The second sub-field 314 may store a value representing a second (middle tier) classification, also referred to herein as a genus classification. The second classification can identify a set of one or more attributes of the FAMILY_NIBP module that is identified by the first classification. The one or more attributes may include types of MOIB 3000 or MOMP messages 300 that are transmitted and/or received by the FAMILY_NIBP module. In an embodiment of the present invention, the second classification may identify a request type of MOMP message that is indicated by a text string identifier "Gn_Request". The Gn_Request identifier may be mapped to a unique numeric value stored into the second sub-field 314. The Gn_Request identifier may indicate that the MOMP message is a request type of MOMP message 300 (See FIG. 3B).

A request type of MOMP message is also referred to herein as being a generic type of MOMP message 300.

The third sub-field 316 may store a value representing a third classification (lowest tier), also referred to as a species classification. The third classification can identify a set of one or more additional attributes of the module identified by the first classification and of the MOMP message type identified by the second classification. The third classification may identify a particular get data type of request MOMP message indicated by a text string identifier "GET_DATA". The GET_DATA identifier may be mapped to a numeric value stored in the third sub-field 316. The GET_DATA identifier may indicate that the MOMP message is a particular GET_DATA type of request type of MOMP message 300 for the family of physiology identified in the highest tier (312 of classification identifier 302. The payload 308 or the MOMP message 300 may carry the identification of a particular family, genus and species of MOIB 3000 data being requested.

All three of the above exemplary identifiers, i.e. FAMILY_NIBP, GENUS_REQUEST, GET_DATA, may be defined within a set of data definitions. The set of data definitions may be referred to as a device data sheet (DDS) (See FIG. 6A). A device data sheet (DDS) may be employed as input to a software generator (See FIG. 5A). The software generator may output source code for directing the execution of a data definition dependent portion of a communications interface 210 implemented with software that executes on a network element.

The device data sheet ADS) may define a module that includes defined data (MOIB) and operations (MOMP) associated with the defined data for processing by a particular device. Preferably, the operations associated with the defined data are expressed in the form of generic and specific MOMP messages that are configured to perform operations upon the defined MOIB data. The device data sheet (DDS) may configure at least a portion of the software that implements a communications interface 210 and provides a GUID that uniquely ties the device to its related DDS.

For example, a GET_DATA message may request the transmission of blood pressure data from a network element receiving the GET_DATA message. The requested blood pressure data may be transmitted by the network element receiving the GET_DATA message via transmission of a PUT_DATA message response to the network element transmitting the GET_DATA message.

Figure 3A:
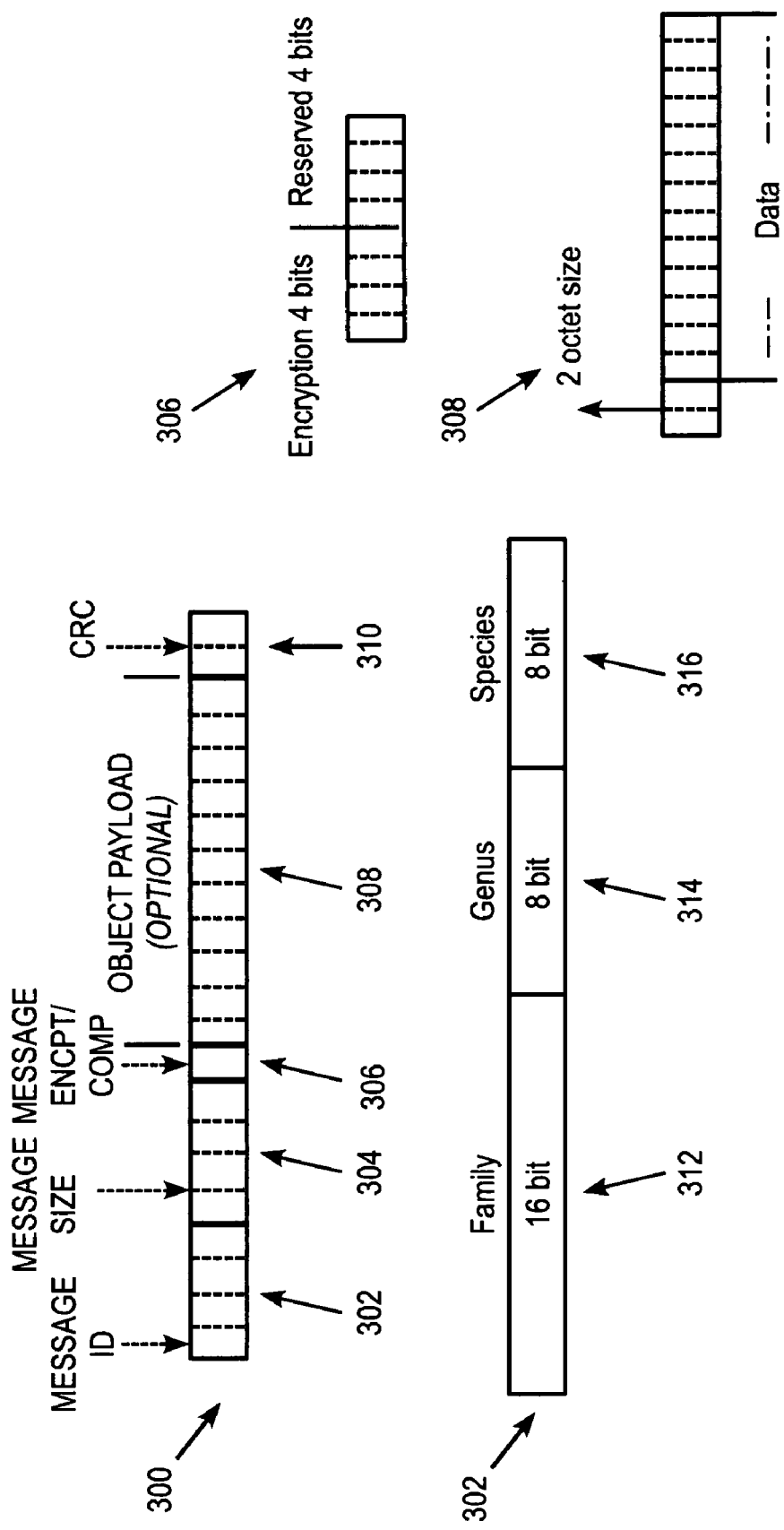
FIG. 3A is a block diagram illustrating a structure of the information that constitutes a medical object management protocol (MOMP) message.
Figures 1, 3A:
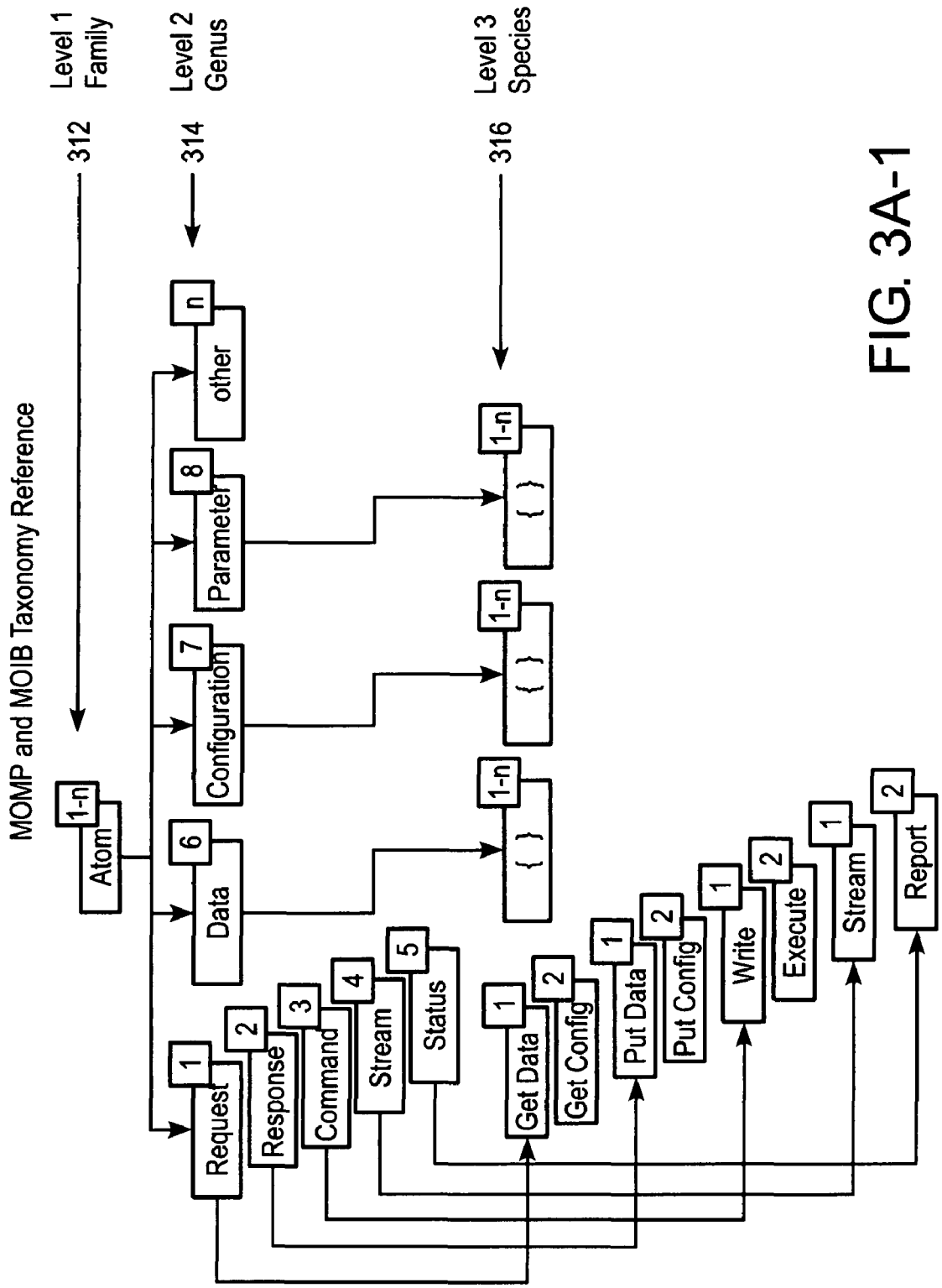

MOMP 300 and MOIB 3000 may use taxonomy as the mechanism to define information and messaging, see FIG. 3A-1. Taxonomy as defined for biology may be "the science dealing with the description, identification, naming, and classification of organisms". MOMP 300 and MOIB 3000 may apply this definition to the description, identification, and classification of a semantic communication model. Semantics may be defined as the study of linguistic development by classifying and examining changes in meaning and form.

Taxonomy may be extensible. Taxonomy may logically separate information into families that can evolve. MOMP and MOIB may use taxonomy in semantic modeling. As described above, semantics may be the study of changes in meaning and form. Changes in meaning and form may best describe the behavior of information models in medical space or in any adaptive complex system where terminology is constantly changing and evolving.

Semantic class based modeling, utilizing taxonomy, may minimize the complexity of data description management via a design approach that limits, categorizes, and logically groups information management (symbols) and operational functions (messages) into atomic families. The taxonomic tree in FIG. 3A-1 is a visual representation used to model messages and symbols in the MOMP and MOIB design.

The first or Family level in FIG. 3A-1 may represent the physiologic family of information 312, however, it could be any family of information provided by a machine. The second or genus level 314 may define the semantic identity for a standard MOMP message or a MOIB data member. The third or Species level 316 may represent the specific message action or data type. A computer language may use numbers to identify messages. Using the tree diagram in FIG. 3A-1, MOMP and MOIB may combine numbers in sequence to provide a unique numeric signature or class identifier 302 for messages 300 and information 3000 in an atomic family.

Figures 2, 3A:
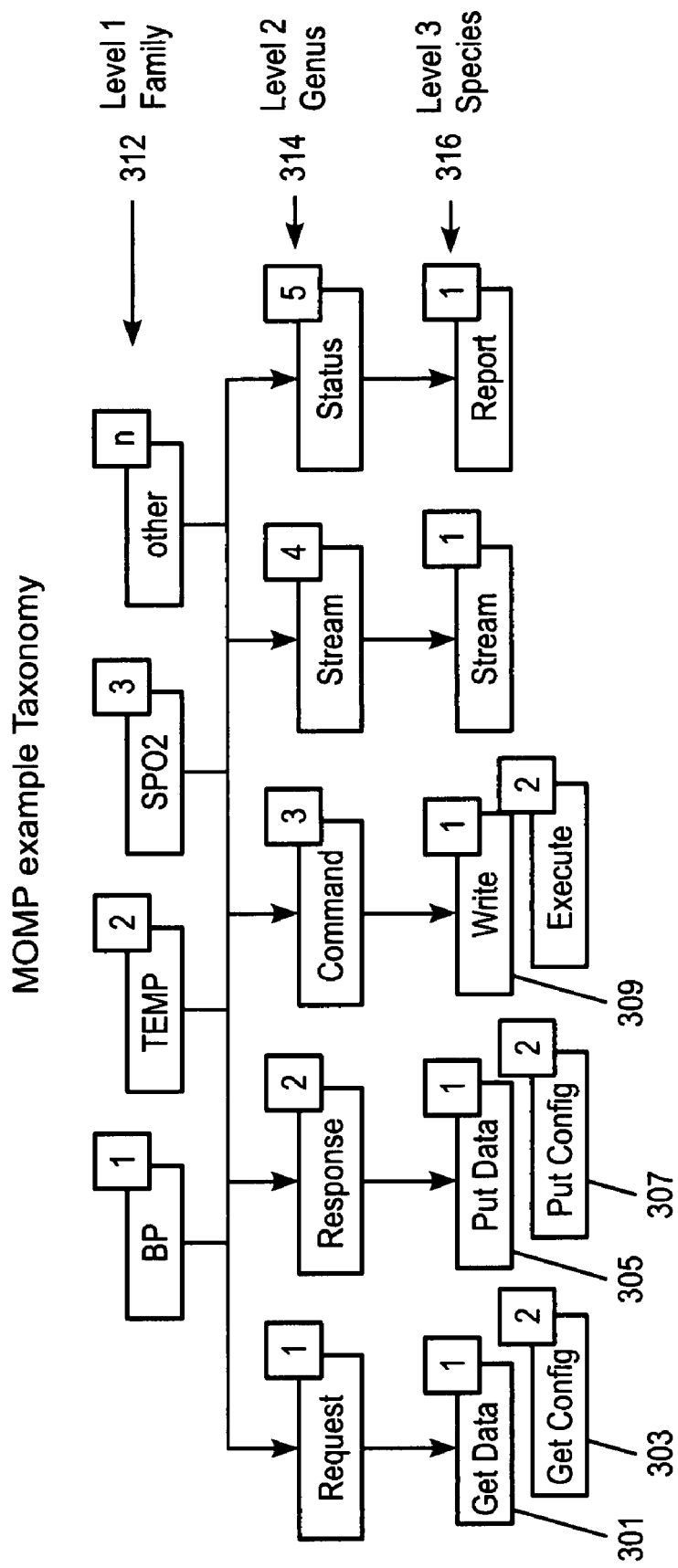

Using the taxonomy a machine may be provided with a set of standard message class identifications 302 recognizable by machines engaged in dialogue, see FIG. 3A-2.

In FIG. 3A-2 a MOMP message identifier may have a signature. A data request message 301 may be the set {1,1} of combined genus 314 and species 316. Other message signatures manifest as {1,2} for configuration data request 303, {2,1} for data responses 305, {2,2} for configuration data responses 307, and {3,1} for write commands 309, etc. The identification provided in the combination of the message genus 314 with the species 316 may provide the foundation for a message signature and therefore the dialogue rules communicating network machines adhere to in order to carry intelligent dialog in an open communication system. The family identifier 312 can represent any family of information supported in a machine. The signature for the message in the genus 314 and species 316 may contain the same MOMP message signature for any atomic family. The genus 314 and species 316 signature may define the predicate or actionable part of the semantic taxonomic model in MOMP. In an embodiment of the present invention the message signature may be used in machine dialogue to recognize message intent and respond intelligently. Examining the learning process the ability to understand sentence structure or the subject from predicate provides a vehicle to respond to unrecognized subjects (or families) by soliciting for the definition. These message signatures 314, 316 represent the grammatical rules in machine dialogue just as sentence structure and grammatical rules are defined in human language.

Figures 3, 3A, 4, 5:
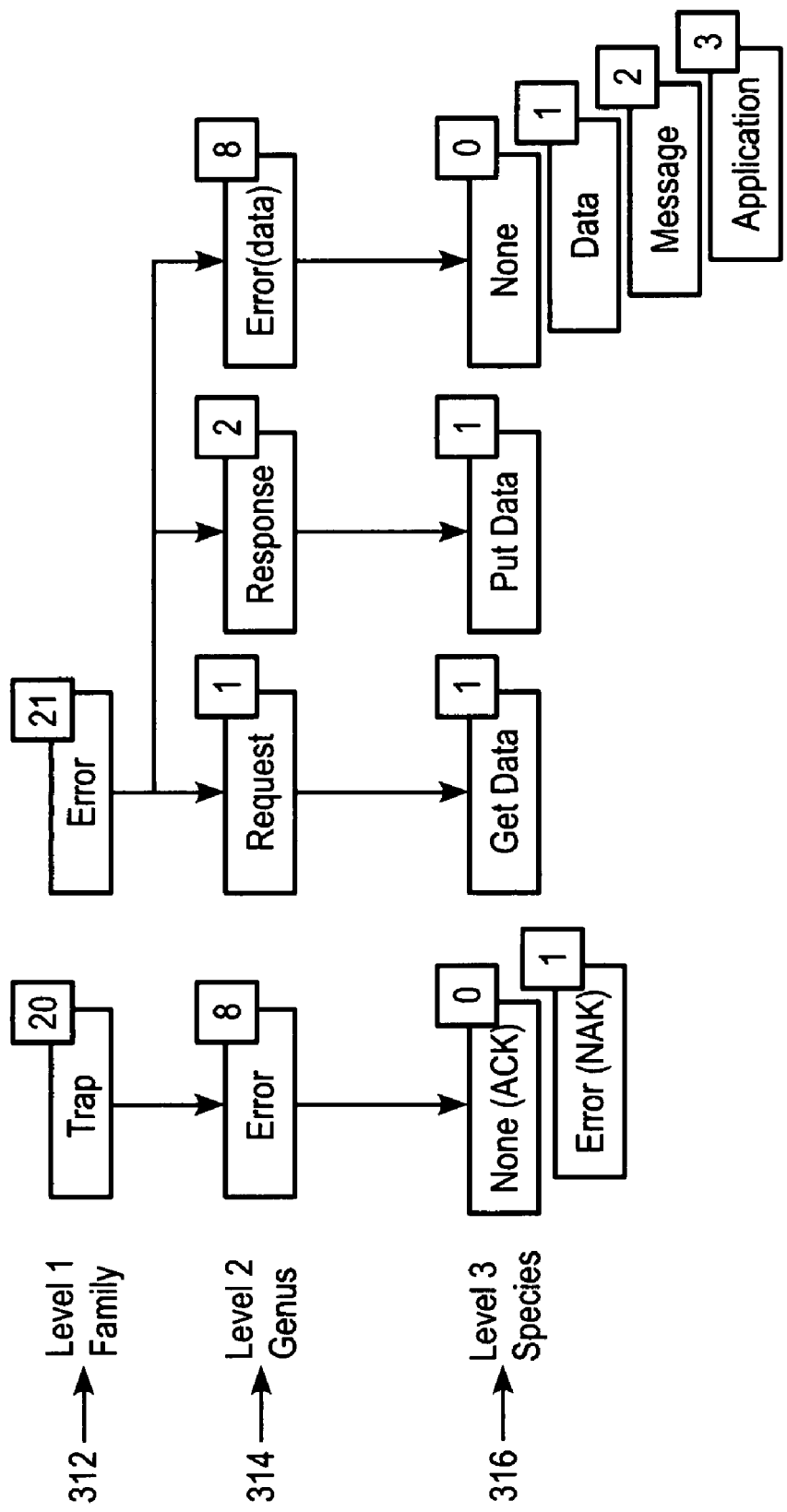
Figures 3, 3A, 4, 5, 6, 7, 8, 9, 10, 11:
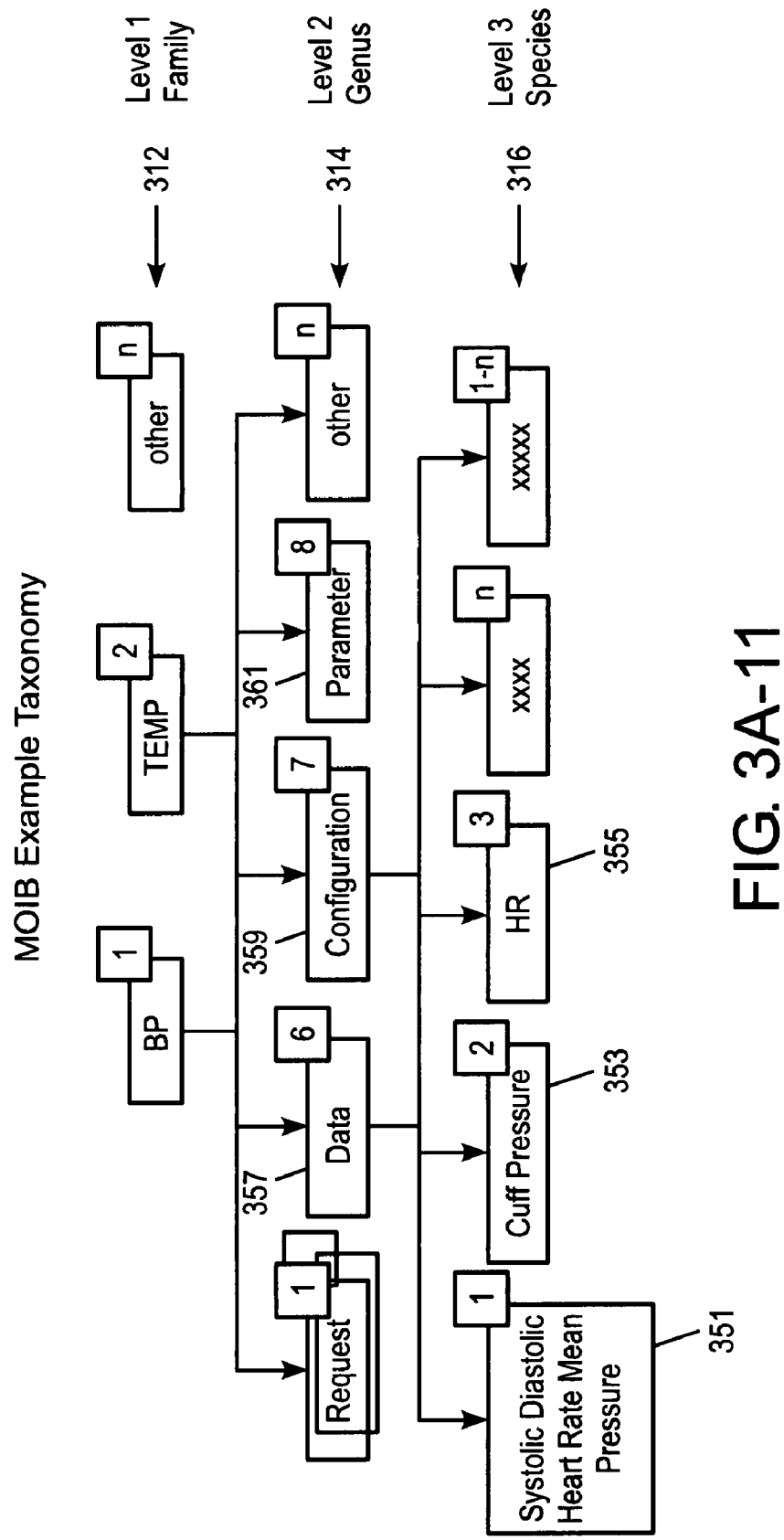
Figures 3, 3A, 4, 5, 6, 7, 8, 9, 10, 11, 12:
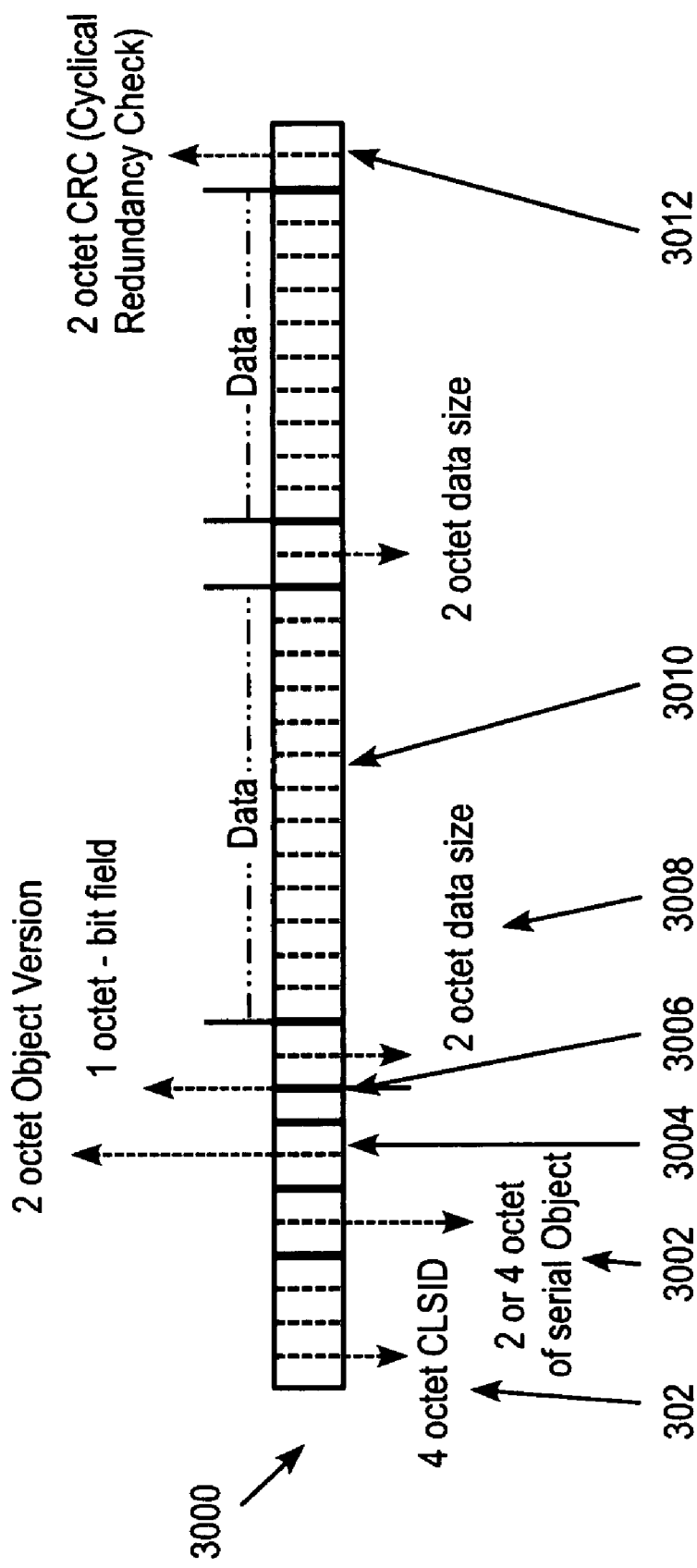

In language, sentence structure dictates how individuals communicate. In MOMP machine message signatures 302 may be defined. In MOIB information signatures 302 may be defined in numeric terms using the reference taxonomy, as in FIG. 3A-1. The numeric combination of family 312, genus 314, and species 316 may combine to create a classification identifier 302 understood by machines. In an embodiment of the present invention, machines employing this technology may use the numeric taxonomic signatures to create sentences consisting of a predicate (MOMP) and subject (MOIB). In FIG. 3A-3 a blood pressure definition may separate the numeric representations for both the MOMP message rules and the MOIB information symbols using the reference taxonomy FIG. 3A-1 to allow for the creation of a machine readable sentence.

In an example embodiment of the present invention FIG. 3A-3 lists the standard MOMP message identifiers for any family employed by any machine. The messages may be synonymous with the predicate 311 or actionable part of a sentence. In a subject section 313 of FIG. 3A-3 the MOIB information or subject may be defined for the blood pressure family. Combining the predicate and subject may provide a mechanism for the creation of machine readable sentence, see FIG. 3A-4 at Step 1 315. In an example embodiment of the present invention, the sentence "Give me your cuff pressure" can be created.

Following the request for information a return response may result, see FIG. 3A-4 at Step 2 317. Using the same method a predicate may be combined with a subject to create the desired outcome. The example outcome or response expected may be "My cuff pressure is N."

The process defined in FIG. 3A-4 may define a message 300 request carrying the MOIB classification ID 302 in a payload 308 of the MOMP message 300. Class ID in the payload 308 of the message 300 may represent the requested information (in this case the cuff pressure). The response message 300 may be the class ID 302 representing the response set {1,2,1}. The MOMB object 3000 may be found in the payload 308 of the response message 300. As mentioned earlier MOIB may define primitive types used to carry information.

MOMP may define an open network so any interrogating machine can manage any other by employing dialogue rules. Management may infer the ability to solicit another machine for information openly. In the example embodiment in FIG. 3A-4 if the solicited device is not a blood pressure device a response with an unrecognized subject or no-acknowledge (NAK) may be required.

Using the reference taxonomy a set of MOMP messages 300 and MOIB information 3000 representing an "I don't have it" response may be defined, see FIG. 3A-5. FIG. 3A-5 may define the standard feedback response used to handle all acknowledge and no-acknowledgement. This may be synonymous with the message ability to say "Yes" or "No" for messages requiring feedback. The trap family may be a standard construct used by all MOMP dialogs to create a standard "Yes" or "No" acknowledgement. All MOMP based dialogues may use this mechanism to acknowledge the state of a message transaction.

The trap "Yes" and "No" message 300 may carry information representing an extended reason why it can not perform a function in the payload 308. The information may include a machine based number or error code that represents the reason code for the failure. It may also carry an MOIB object 3000 containing human displayable text defining the failure. This may be similar to a response in which a person says "No" and then provides details as to why they are unable to comply. In a machine to machine request for data the device receiving a request for information may return a "No" carrying information in the form of a text string reading "System Busy" or "Data Unavailable". For information requests from a family unsupported an "Unsupported family" response may result. Recall that the machine may recognize the message signature for request as defined earlier. It may or may not support the family 312 defined by the class identification 302 in the received message. However, the machine may recognize the combination of the genus and species 314, 316 as the set representing a request. At this time the machine preferably must resort to communicating a trap.

MOMP may be designed on sentence structure and may exhibit the ability to recognize a predicate. Information interoperability may break down in FIG. 3A-4 when the family identifier 312 is not recognized. Dialogue-based interoperability may not break down, however, due to the recognition of the message genus 314 and species 316 as a standard MOMP message type. This may provide a machine an avenue to seek the definition of the family 312 to comprehend the message.

The machine to machine interaction in FIG. 3A-6 may still be governed by the same rules of language engagement. The request in FIG. 3A-6 at Step 1 315 may be the same request defined in FIG. 3A-4, i.e., "Give me your cuff pressure." If a positive response 325 in FIG. 3A-6 at Step 2 317 is not realized, a negative response Option 1 319 or a negative response Option 2 321 may be returned. If Option 2 321 in FIG. 3A-6 results, the trap may contain extended information as to the cause of failure. If Option 1 319 in FIG. 3A-6 results, the machine may resort to Step 3 323 in FIG. 3A-6 and request the error details from the machine producing the error. The error family taxonomy may include a request and a response MOMP message 327, see FIG. 3A-5. In an embodiment of the present invention, using the e-code received, a machine receiving a plain "No" response 329, as in Option 1 319 of FIG. 3A-6, may use the e-code (error code) to solicit the reason from the "No" response.

In an embodiment of the present invention there may be an historical inefficiency addressed via the trap mechanism. The efficiency gain may be in the ability for the machine and only the machine to be the source of error information. The source for accurate error information may always the machine generating the error. Historically machines have only supplied error codes without description and expected the machine receiving the error to map the error to a human readable definition of the error using an error string look up. This has proven burdensome, requiring error code maintenance in device hosting machines interfacing with multiple devices and versions of those devices. Extensive updates and resolution of error number overlap is required in systems that map errors. Not supporting error management at the machine creating the error is a fundamental point of failure in a network intending to be interoperable. By leaving the error information in the device and supporting a standard error mechanism to retrieve it, the present invention may remove the need for costly updates and extensive error code management from host machines that interact with many devices.

Command, stream, and status message may be standard MOMP message 300 types and may all behave similarly. Each message type may carry MOIB 3000 information. Commands may send information with the intent to change the machine state. Status messages may carry MOIB information 3000 being reported at regular or irregular intervals requiring acknowledgement. A stream, similar to a status message, may carry continuously reported information but may not require acknowledgement.

A write function may be an example of a standard MOMP type as defined in FIG. 3A-1 and FIG. 3A-2. To write configuration information to a machine may require combining an MOMP message 300 with MOIB carried in the payload 308 as defined in FIG. 3A-7. The trap taxonomy may be used for all acknowledgement communication. An extended description of the e-code returned can be retrieved from the device using Step 3 331.

Execute messages may allow for a managing machine to invoke procedures on a device, see FIG. 3A-8. Command execution messages 300 may carry an MOIB object 3000 in the payload 308 representing the function a managing machine wishes to execute on a target machine. The trap taxonomy may be used for all acknowledgement communication. The e-code returned can be retrieved from the device using Step 3 333 of FIG. 3A-8. FIG. 3A-8 may start a blood pressure reading on a remote machine. The sentence combination in the execute signature is the simple sentence: "Start a blood pressure cycle." The parameter in the signature may carry the command recognized by the machine. The machine may be required to respond with the outcome of the execution command.

A status message may allow a machine to report MOIB information. A machine can periodically report a cuff pressure (or any other information) during the blood pressure process. In an embodiment of the present invention the report may be invoked by a machine based process or from human interaction like the push of a send button on the machine. FIG. 3A-9 demonstrates a potential standard MOMP status reporting mechanism. Status MOMP messages 300 may carry MOIB based information in the payload 308. The trap taxonomy may be used for all acknowledgement communication. The e-code returned may be retrieved from the device using Step 3 335.

A stream message may often be time critical and continuous and may not require acknowledgment. FIG. 3A-10 demonstrates a standard stream message 337 in the communication of cuff pressure to a target monitoring machine at some determined frequency. Stream MOMP messages 300 may carry MOIB based information 3000 in the payload 308. The trap taxonomy may not be used for streaming communications.

MOMP and MOIB may use taxonomy applied to semantics to create a flexible rules based computer language. Using taxonomy numbers may be applied in a hierarchical fashion providing a flexible and extensible mechanism for defining atoms of information in a machine. Each atom may be extensible at all levels of the taxonomy and can evolve independently over time. This may logically separate atoms of information into manageable sets that can be combined to create new atomic configurations of machine based organisms.

Messages in the MOMP taxonomy may allow for the creation of messages via a consistent means for governing and enforcing the rules of language engagement. This may provide the ability for machines to respond intelligently via an understanding of the actionable or predicate of all messages defined in the computer language's grammar or protocol.

FIG. 3A-11 represents an example taxonomy for MOIB information. The first level in this figure may represent the family 312 of information. The genus level 314 may be expanded to define the semantic identity for many anticipated and unanticipated information types. Finally, the species 316 may represent the specific information represented. Like messages, numbers may be used to identify information. In the example taxonomic tree in FIG. 3A-11 the model may be extended to define the information specific to an atomic family. There are potentially many types of information in an atomic family. In some embodiments of the invention there may be sets of common information representing a grouping of information while others are simple types like a basic numeric. In each level the tree can be expanded as new information is discovered. Combining the numbers from each may provide a unique signature or marker for information representation in an atomic family. In embodiments of the present invention machines may be made of atomic families of information. When combined they may provide a taxonomic signature the like DNA for living organisms. Using taxonomy and semantics the present invention may mold many different types of machine based organisms.

As demonstrated with MOMP 300 message signatures MOIB information signatures may be defined along with MOMP messages in atomic families using the taxonomic model in FIG. 3A-1. A machine may use these unique signatures to identify data in dialogue. The combination of family 312, genius 314 and species 316 may be shown in the set {1,6,1} 351. In an embodiment of the present invention, FIG. 3A-11 represents a complex information type representing the diagnostic results for a Non-Invasive Blood Pressure (NIBP). NIBP may include the Systolic, Diastolic, Heart Rate, and Mean Arterial Pressure. The set {1,6,2} 353 in FIG. 3A-11 may be a simple information type representing a cuff pressure value. The set {1,6,3} 355 in FIG. 3A-11 may be an information model representing a heart rate as determined by the blood pressure process. The first two values in the ID may represent semantic symbolism for subject. In FIG. 3A-11 the set {family=1, genus=6} 357 may represent an information part in the atomic family for Blood Pressure. The set {family=1, genus=7} 359 may represent a configuration part in the atomic family for blood pressure. The set {family=1, genus=8} 361 may represent a parameter part in the atomic family for blood pressure.

Each level of the taxonomy may be capable of expansion to new discoveries and adaptation as information evolves. This capacity for evolution and flexibility preferably is essential. Machines in adapting environments may have hardware architectures that vary from machine to machine and from manufacturer to manufacturer. This may be due to customer requirements and marketing requests as well as the engineering capacity and investment in the machine hardware and software. Due to these differences, a single fixed definition supporting interoperability is unlikely to span multiple devices across manufacturers. In some embodiments of medical devices, hardware may dictate differentiation in diagnostic physiology information definition and more importantly the configuration of the hardware and software systems that capture it. In some embodiments of a medical device, one blood pressure device may employ more complex hardware/software combination producing a higher resolution pressure reading. The algorithm assisting in the calculation of the diagnostic results may provide configuration options more complex from another manufacturer performing the same function. Applications interacting with evolving devices may require expensive maintenance updates to understand different manufacturers and device capabilities. Communicating with multiple devices with different information models result in increased complexity in the design of applications. Applications that gather physiology, program devices, or perform other interoperable functions have to be rebuilt when devices information models are changed in device lifecycles. As new devices are introduced, application consumers of machine data must be updated in order to recognize new information models.

FIG. 3A-12 is a block diagram illustrating a structure of the information that constitutes a medical object information base (MOIB) object structure 3000. The MOIB Structure may reside within and be carried by the buffer field 308 of the MOMP message 300 or may be carried within the interchange protocol message 220, 240. The structure of the MOIB objects may be divided into a plurality of portions, referred to as fields. The fields may include an object identifier field 302, an object size field 3002, an object version field 3004. a object bit field containing compression indicators 3006, and one to many combinations of a data size field 3008 and a data buffer field 3010, this may be followed by and a cyclic redundancy check (CRC) field 3012.

FIG. 3B is a block diagram illustrating an MOMP message exchange between a host or server computer 110C and a VSMD 140N including a request type of MOMP message. As shown, the host or server computer 110C may transmit an MOMP request communication 322 to the VSMD 140N for receiving blood pressure measurement information from the VSMD 140N. The request communication 322 may include an MOMP message 300 with a message identifier field including the first, second and third sub-field values represented by the symbols FAMILY_NIBP, GENUS_REQUEST and GET_DATA. The MOMP message 300 may carry a payload 308 in the form of a class identification 302 for MOIB information defined in the FAMILY_NIBP data segment of the DDS indicating the information to gather and return.

The first classification identifier FAMILY_NIBP may identify a module that includes a set of measured blood pressure related data. The second classification identifier GENUS_Request may identify a request type of MOMP message 300 that is defined in association with the FAMILY_NIBP. The third classification identifier GET_DATA may identify a specific structure or representation of data request class that is requested by the host or server device 110C via the GENUS_REQUEST type of message. The host or server computer 110C preferably requests that the VSDM 140N transmit a response type of MOMP communication, including an instance of the specific structure and representation of data called out in the payload request 308, to the host or server computer 110C in response to the request communication 322.

In response to receiving the request communication 322, the VSMD 140N may transmit a MOMP response communication 324. The response communication 324 may include an MOMP message where the message identifier field may include three sub-field values represented by the symbols FAMILY_NIBP, GENUS_RESPONSE and PUT_DATA respectively. The payload 308 of the response MOMP message 300 may include the instance of the specific MOIB object structure 3000 and representation of data associated with the GET_DATA species classification.

The first value (FAMILY_NIBP) may identify the module that includes the requested set of measured blood pressure related data. The second value (GENUS_RESPONSE) may identify a response type of MOMP message defined in association with the FAMILY_NIBP module. The third value (PUT_DATA) may identify a specific structure or response representation of data being transmitted by the VSMD 140N via the Gn_Response type of MOMP message 300.

In some circumstances, the VSMD 140N may be unable to transmit a response type of MOMP message communication 324 for responding receipt of the request type of MOMP communication 322. In this circumstance, the VSMD 140N may instead transmit a trap type of MOMP communication 326 in response to the request type of MOMP communication 322. The trap communication 326 may include a trap type 330 of MOMP message 300.

The trap type of MOMP message 330 may be structured like a generic MOMP message 300 and carry an MOIB error object 3000. Like other generic MOMP messages 300, the trap type of MOMP message 330 may have a message identifier field 302 including first, second and third sub-field values. The first, second and third sub-field values may be represented by text string identifiers "FmTRAP", "GnError" and "SpError" respectively.

The first identifier (FmTRAP) may indicate a module within the VSMD 140N responding to the original communication 322 transmitted from the host or server computer 110C. For example, the original communication 322 may have been addressed to the FAMILY_NIBP module of the VSMD 140N, but the FAMILY_NIBP module may have been unable to perform actions associated with the original communication 322. As a result, the FAMILY_NIBP module may have transferred control to the FmTRAP module of the VSMD 140N for responding to the original communication 322.

The second classification identifier (GnError) may identify an error type of message defined in association with the FmTRAP module. The third classification identifier (SpError) may identify a type of error that has occurred. The error identified by the third classification identifier (SpError) may be referred to herein as a "NAK", meaning a non-acknowledgement type of trap MOMP message. In other circumstances, a third classification identifier (SpNone) may identify an error as an "ACK", meaning an acknowledgement type of trap MOMP message.

The trap message 330 may include an error MOIB object in the payload 340 also referred to herein as a trap MOIB object 3000 with specific fields 340. The error fields 340 may reside within an MOIB object 3000 in the buffer field 308 of the MOMP message 300 and may include error identification data. The error identification data may describe one or more errors resulting from actions or attempted actions of the VSMD 140N in response to receiving the original communication 322.

The MOIB object 3000 in the payload field 342 may be further divided into a plurality of fields carried in the payload 3010 of the MOIB object. The fields may include a message size field 346, a message identifier field 302, an error opcode field 348, a textual error description field 356, an extended error size field 358, and an extended error information field 360.

Preferably, the message size field 346 is expressed in units of bytes. The message identifier field 302 may identify the MOMP message 300 included within the original communication 322 that the error object is responding to. Hence, the message identifier field 302 may include the identifiers (FAMILY_NIBP, GENUS_REQUEST and GET_DATA) stored in the request type of MOMP message 300 included within the original communication 322.

Preferably, the message size field 346 is expressed in units of bytes. The message identifier field 302 may identify the MOMP message 300 included within the original communication 322 that the error object is responding to. Hence, the message identifier field 302 may include the identifiers (FAMILY_NIBP, Gn_Request and GET_BP) stored in the request type of MOMP message 300 included within the original communication 322.

The error opcode field 348 may store a generic error code provided by the module that received the original communication 322. For example, the error opcode field 348 may be provided by the FAMILY_NIPB module. The textual error description field 356 may be text that is also supplied by the module that received the original communication 322. For example, the textual error description field 356 may be provided by the FAMILY_NIBP module. The host or server computer 110C preferably is not required to maintain an exhaustive list of error definitions associated with the network elements with which the host or server computer 110C may later communicate.

The extended error information field 360 may be provided by the VSMD 140N itself and may be device specific. The extended error information field 360 is preferably not generic information like the generic information originating from the FAMILY_NIBP module data definitions and/or the communications protocol interface (CPI) software, also referred to herein as communications interface software. The extended error size field 358 may indicate the size of the extended error information field 360, preferably in units of bytes.

Figure 3C:
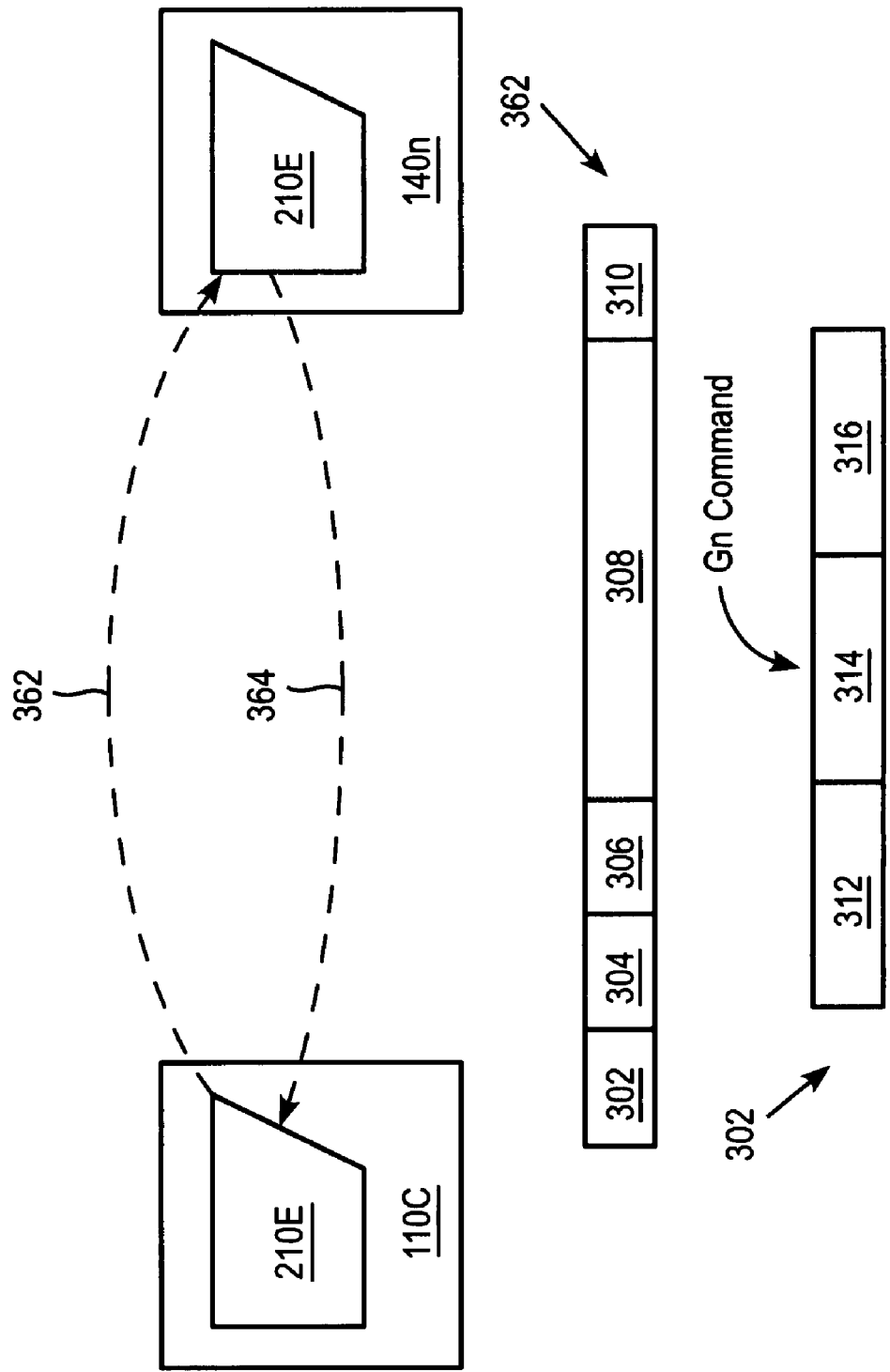
FIG. 3C is a block diagram illustrating an MOMP message exchange between a host device and a VSMD including a command type of MOMP message.

FIG. 3C is a block diagram illustrating an MOMP message exchange between a host or server computer 110C and a VSDM 140N including a command type of MOMP message 300. As shown, the host or server computer 110C may transmit a command communication 362, including a command type of MOMP message, to the VSMD 140N.

A command communication 362 may direct a specific action performed by the network element receiving the command communication 362. The command communication 362 may include a command type of MOMP message 300 having a message identifier field including the first, second and third sub-field values represented by the text string identifiers FmNIBP, GnCommand and SPExecute respectively.

The first classification identifier FmNIBP may identify a module that includes a set of measured blood pressure related data. The second classification identifier GnCommand may identify a generic GnCommand type of MOMP message that is defined in association with the FmNIBP module. The GnCommand may be a command type of MOMP message. The third classification identifier SpExecute may identify a specific command type of MOMP message defined within the GnCommand classification of the FmNIBP module. The third classification identifier SpExecute is a generic EXECUTE command type of MOMP message (300) carrying an object payload (308) indicating the type of command to execute.

The EXECUTE command may be transmitted by the host or server computer 110C from the VSMD 140N as a GnCommand type of MOMP message associated with the FmNIBP module. The host or server computer 110C may direct the VSMD 140N to initiate a start of a blood pressure measurement cycle via the directives found in the payload 308 of the execute MOMP message (300).

In response to the command communication 362, the VSMD 140N may transmit an MOMP trap type of communication 364 including a trap type of MOMP message having a message identifier field including the three classification subspecies represented by the text string identifiers "FmTRAP", "GnError" and "SpNone", respectively. In this circumstance, the third classification identifier value SpNone may identify an "ACK", meaning an acknowledgement type of trap message. The acknowledgement may indicate a successful completion of the performance of the execute command, for example the successful initiation of a start of a blood pressure measurement cycle by the receiving network element. In other circumstances where the Execute command is not performed, the third value may equal SpError to indicate a "NAK", meaning a non-acknowledgement type of trap message. The non-acknowledgement may indicate an unsuccessful completion of the performance of the command, namely, the non-performance of the initiation of a start of a blood pressure measurement cycle by the receiving network element.

Figure 3D:
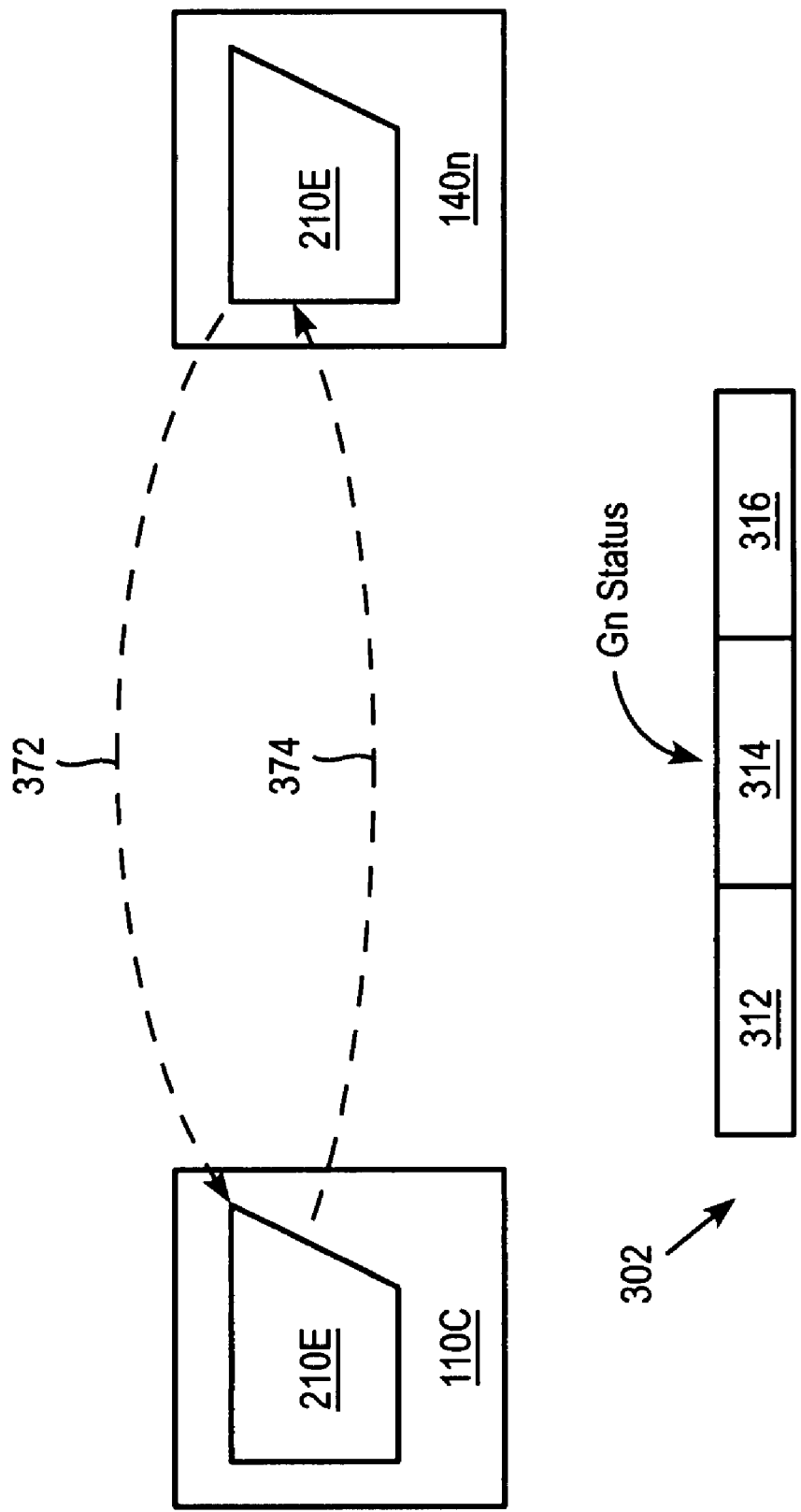
FIG. 3D is a block diagram illustrating an MOMP message exchange between a host device and a VSMD including a status type of MOMP message.

FIG. 3D is a block diagram illustrating an MOMP message exchange between a host or server computer 110C and a VSMD 140N including a status type of MOMP message. As shown, the VSMD 140N may transmit a communication 372 including a status type of MOMP message 372 to the host or server computer 110G A status type of MOMP message 372 may provide MOIB 3000 information to a host or server computer 110C receiving the status type of MOMP message 372.

The status type of MOMP message 372 may include a static type of MOMP message 300 having a message identifier field including the sub-field values represented by a first classification text string identifier, such as "FmNIBP" for example, a second classification text string identifier, such as "GENUS_STATUS" for example, and a third classification identifier, such as "REPORT_BP" or Simply "REPORT_DATA" for example. The "FmNIBP" identifier may indicate the module transmitting the status type of MOMP message 372. The GENUS_STATUS identifier may indicate that the message is a status type of MOMP message.

The first classification identifier, FmNIBP, may also indicate that the module transmitting the status type of MOMP message 372 includes a set of measured blood pressure related data. The second classification identifier, GENUS_STATUS, may identify a GnStatus type of MOMP message defined in association with the FmNIBP module. The GnStatus type of MOMP message may be a status type of MOMP message. The third value REPORT_BP or REPORT_

DATA may identify a specific type or non-specific type of status information respectfully included within the GnStatus classification.

Typically, a status type of MOMP message 372 may be transmitted periodically, over time. For example, a communications software module can be configured to transmit a status type of MOMP message 372 to a particular destination every 10 minutes. Other time periods and configurations are possible depending on the intended use. The host or server computer 110C may respond by transmitting a trap communication 374 that indicates an acknowledgement or a non-acknowledgement of the status communication 372 (See FIG. 3B).

Not all modules may be defined including associated status types of MOMP messages. As a result, a status type of MOMP message may or may not be associated with a particular module. There can be many different defined types of status messages.

FIG. 3E is a block diagram illustrating an MOMP message exchange between a host or server computer 110C and a VSMD 140N including an event type of MOMP message. As shown, the VSMD 140N transmits an event type of MOMP message 382 to the host or server computer 110C.

An event type of MOMP message 382 may provide information to a host or server computer 110C receiving the event type of MOMP message 382. The event type of MOMP message 382 may include a message identifier field including the sub-field values represented by a first classification text string identifier, such as "FmPrinter", a second classification text string identifier, such as "GnEvent", and a third classification text string identifier, such as "HW_MOD_CONNECT".

The first classification identifier, FmPrinter, may identify a particular module that interfaces with a printer. The second classification identifier, GnEvent, may identify a GnEvent type of MOMP message defined in association with the FmPrinter module. The third classification identifier, HW_MOD_CONNECT, may identify a specific type of event information included within the GnEvent classification. For example, the HW_MOD_CONNECT event may identify the occurrence of a hardware module being connected with a printer device associated with the FmPrinter module.

Not all modules may be defined including associated event types of MOMP messages. As a result, an event type of MOMP message may or may not be associated with a particular module. There can be many different defined types of event messages as indicated by a specific or species identifier.

Typically, an event type of MOMP message 382 may be transmitted in response to an occurrence of an event. For example, a communications software module can be configured to transmit an event type of MOMP message 382 upon the occurrence of an event represented by the HW_MOD_CONNECT symbol, where hardware is being connected with a printer device associated with the FmPrinter module. The host or server computer 110C may respond by transmitting a trap communication 384 indicating an acknowledgement or a non-acknowledgement of the event type of MOMP message 372 (See FIG. 3B).

Figure 3F:
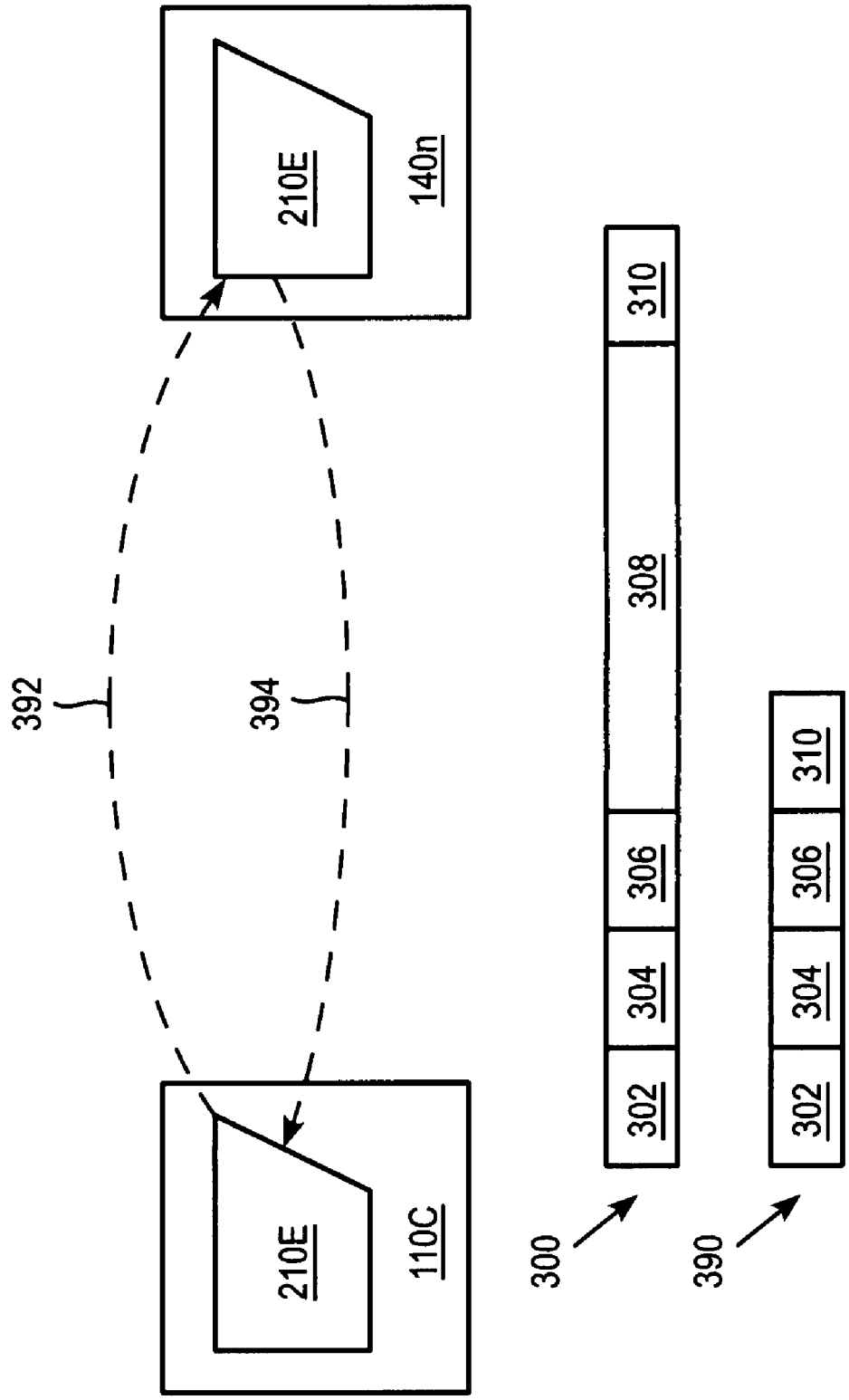
FIG. 3F is a block diagram illustrating a keep alive communications transmitted between network elements.

FIG. 3F is a block diagram illustrating a keep alive communication 392 and a trap communication 394 transmitted from a host or server computer 110C to a VSMD 140N. Generally, a keep alive communication 392 may indicate to the receiving network element that the sending network element is active (alive) with respect to communicating over a particular connection between the network elements. If a receiving network element that expects to receive a keep alive communication does not receive a keep alive communication over a pre-determined period of time, then an inference can be made that the sending network element is no longer available to communicate.

A keep alive type of MOMP message 390, like a regular MOMP message 300, may include an identifier field 302, a message size field 304, a message encryption field 306 and a cyclic redundancy check (CRC) field 310. Unlike an ordinary MOMP message 300, the keep alive type of MOMP message 390 may exclude an object buffer field 308.

The keep alive type of MOMP message 390 may have a message identifier field 302 including the sub-field values represented by a first classification text string identifier, "FmCONNECTION", a second classification text string identifier, either "GnREQUEST", "GnRESPONSE", "GnCOMMAND", or "GnCONFIG", and a third classification text string identifier, either "SpKEEPALIVE", "SpSHUTDOWN", "SpKEEPALIVEON" or "SpKEEPALIVEOFF".

The first classification identifier FmCONNECTION may identify a particular module associated with a connection between network elements. The second classification identifier may identify an associated MOMP type of message. The third classification identifier value may indicate the particular function of the keep alive type of MOMP message 390.

If the third classification equals "SpKEEPALIVE", it may indicate to a receiving network element that the sending network element is active (alive) with respect to communicating over a particular connection between the network elements. If the third classification identifier equals "SpSHUTDOWN", it may indicate to the receiving network element that the sending network element is initiating a shutdown of the connection between the network elements. If the third classification equals "SpKEEPALIVEON", it may indicate to the receiving network element that the sending network element is requesting that the receiving network element periodically transmit a keep alive type of MOMP message 390. If the third classification equals "SpKEEPALIVEOFF", it may indicate to the receiving network element that the sending network element is requesting that the receiving network elements not periodically transmit a keep alive type of MOMP message 390.

Figure 3G:
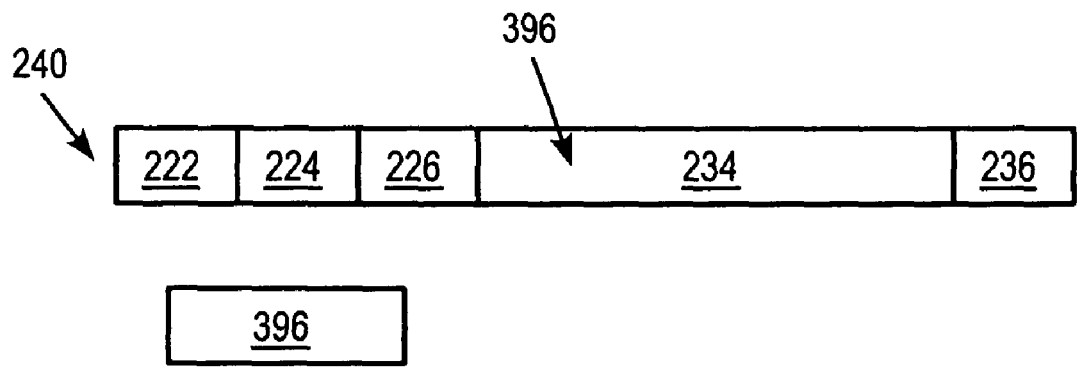
FIG. 3G is a block diagram illustrating a structure of the information that constitutes a data object message.

FIG. 3G is a block diagram illustrating a structure of the information that constitutes a MOIB object message 396. A MOIB data object message 396 may be carried within the data buffer field 234 of an Interchange envelope 220, 240 in the same manner as an MOMP message 300. The data object message 396 may substitute for an MOMP message 300 within the data buffer field 234.

The structure of the data object message 396 may be divided into a plurality of fields as described by MOIB 3000.

Transmitting a MOIB data object 396 that is not enclosed within a MOMP message 300 may reduce the byte count required per transmission and may be more efficient with respect to bytes required to transmit data. In some embodiments, a MOIB data object message 396 can be used for streaming of data between network elements.

Figure 4A:
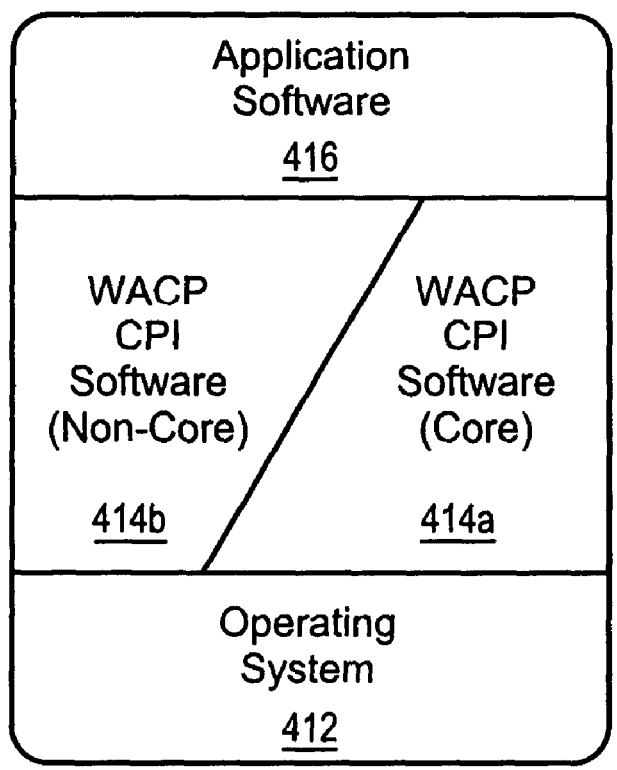
FIG. 4A is a block diagram illustrating a structural arrangement of software in accordance with an embodiment of the invention.

FIG. 4A is a block diagram illustrating a structural arrangement of a communication protocol interface software in accordance with an embodiment of the invention. The communication protocol interface software 414a, 414b may implement an upper protocol stack 210D-210F. Operating system software 412 may implement a lower protocol stack 210A-210C.

The communication protocol interface software 414a, 414b may be divided into a core portion 414a and a non-core (extensible) portion 414b. The core portion may function as a generic framework that specifies functionality including connection establishment, connection termination, encryption and generic message types. Generic message types may include request, response, command, status and error types of MOMP messages. The non-core (extensible) portion 414*b* may allow for the addition of modules including associated MOIB data and message definition intended for use with the message capability in the core portion. The added modules may extend the functionality of the core portion 414*a* of the communication protocol interface.

In some embodiments, data definitions are employed to define the information model of the device. The information manifests in module(s) defining specific structures of data found in a family and is not limited to medical information. Within the same family the messages manifest in definitions for request, response, command, status, and error types of MOMP messages associated with the defined module(s) in said family. The non-core (extensible) portion 414*b* of the communication protocol interface may supplement and customize the core portion 414*a* to accommodate particular applications and manifests as the information parts defined in the family or families The core portion 414*a* may implement communication protocol interface functions regardless of what modules are or are not defined within a particular communications protocol interface configuration. The non-core portion 414*b* of the communication protocol interface may implement the non-core supplemental and customizable functionality in the form of modules representing data definitions in a target instance. In some embodiments, modules can be added via data definitions that define module related functionality including operations upon module associated data and messages. The non-core (extensible) portion 414*b* of the communication protocol interface may supplement the functionality of the core portion 414*a* and the communication protocol interface as a whole.

The core portion 414*a* may interface with an operating system 412. Both the core portion 414*a* and the non-core portion 414*b* may interface with application software 416.

The non-core (extensible) portion 414*b* may enable customization of the implementation of the communication protocol interface itself to accommodate particular communications requirements required by the operation of a particular set of one or more network elements. For example, a portion of the communication protocol interface may be configured to accommodate communication of particular types and structures of data, such as types of physiological data that are required by a particular set of network elements.

The non-core (extensible) portion 414*b* may also enable each implementation or instance of the communication protocol interface to perform a small or large subset of an entire configuration and version of the communication protocol interface. Accordingly, each network element, such as a VSMD 140N, can be configured to implement a small subset of an entire version of the communications protocol interface. Accordingly, each network element may execute a corresponding small subset of the communication protocol interface. Consequently, individual network elements can be uniquely and efficiently configured to communicate a portion, whether a small or large portion, of a vast amount and variety of universally defined device independent data or information within a network that is configured to acquire, communicate, and process such data.

Figure 4B:
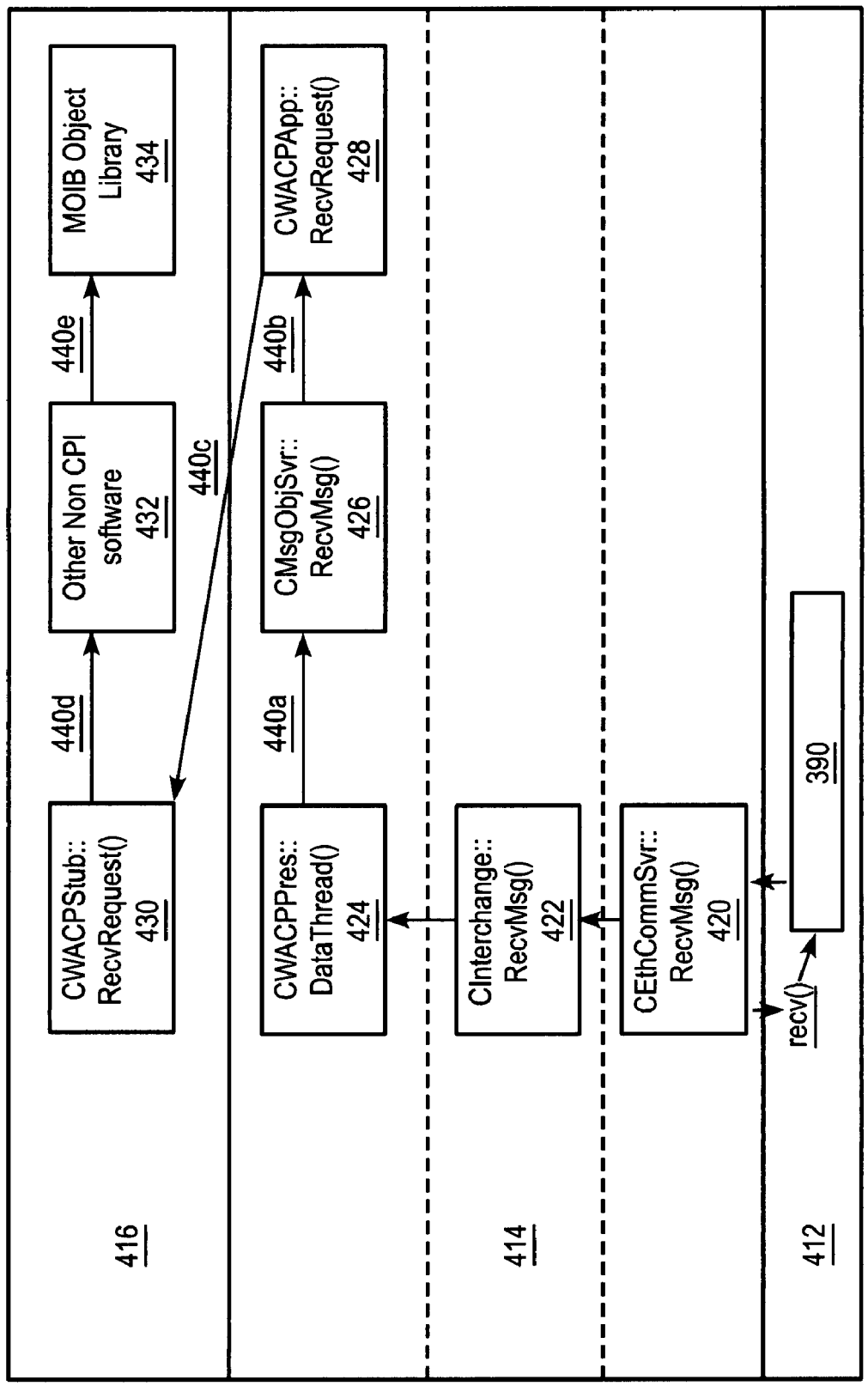
FIG. 4B is a block diagram that illustrates a path of execution through an embodiment of communications protocol interface software that receives, processes and routes an incoming request type message.

FIG. 4B is a block diagram illustrating a path of execution through an embodiment of the communication protocol interface 414 that receives, processes and routes an incoming request type of message. For exemplary purposes, the communication protocol interface 414 is shown as residing within a VSMD 140N. The communication protocol interface 414 can also reside in any network element that is configured to employ the communications protocol interface 414, including, for example, a host or server computer 110C and/or other types of devices configured to interoperate with communication protocol interface 414 enabled network elements.

The core portion of the communication protocol interface 414 may be included within a plurality of software objects 420-428. In this embodiment, the software objects may be developed from C++ or other programming language source code. Each software object may encapsulate instructions and data. The instructions of a software object may reside within its methods, which are functions residing inside of the software object. In other embodiments, software objects can be developed from other types of source code, such as, for example, the source code of the C, C# (C sharp), Java or other programming languages.

A message 390 may be transmitted to the VSMD 140N from another network element. The message 390 may be received and buffered by the operating system 412. The message 390 in FIG. 4B may be a request type of MOMP message having a first, second and third message classification enclosed within an interchange envelope 220. The communication protocol interface 414 may route, process and deliver the message 390 to an appropriate location within the application software 416 provided that the message 390 passes various integrity checks performed by the communication protocol interface 414.

The processing and delivery of the message 390 may be performed according to various attributes of the message 390, including the first, second and third message classifications stored within the message 390. Upon delivery of the message 390 to a particular location within the application software 416, the application software 416 will decide how to respond to the delivery of the message 390.

A path of execution 440 for receiving, processing and routing the WACP message 390 is shown. The path of execution 440 may travel through the operating system 412, through the communication protocol interface 414, and into the application software 416. The communication protocol interface software 414 may include a set of software objects 420-428 that collectively receive, process and route the message to the application software 416. Portions of the application software 416 may also be included within a set of software objects 430-434.

In this embodiment, the operating system 412 may be implemented as a Microsoft Windows 32 bit operating system, such as Windows XP. The operating system 412 and its associated software, including its device and network drivers, may implement a lower protocol stack 210A-210C of the communication protocol interface (See FIG. 2B). The communication protocol interface 414 and its associated software objects 420-228 may implement an upper protocol stack 210D-210G.

The upper protocol stack 210D-210G of the communications protocol interface 414 may receive communications from the lower protocol stack 210A-210C of the operating system 412 as follows:

A RecvMsg( ) method of an CEthCommSvr object 420 may call a recv( ) function residing inside of a ws2_32.dll dynamic link library (DLL) to receive a queued message 390 buffered inside 412. The ws2_32.dll may be provided by Microsoft to interoperate with its Windows operating systems including Windows XP, Windows 2000, Windows NT and Windows Server 2003, or any other platform for example.

The RecvMsg( ) method of the CEthCommSvr object 420 is serviced by the interchange layer 422 checking for the availability of communications data received from the lower protocol stack 210A-210C. The Communications server 420 notifies the interchange layer (422) of a message received. The interchange layer 422 notifies a data thread 424 of the message availability via a semaphore In response to the semaphore being set, the message input thread executing the DataThread( ) method of the CWACP-Pres object 424 may unblock and call a ProcessMsg( ) method (not shown) of the CWACPPres object 424, which may call 440a the RecvMsg( ) method of the CMsgObjSvr object 426. The method or function call 440a may cause the message input thread to leave the CWACPPres object 424 and to enter the CMsgObjSvr object 426, and to travel further along the path of execution 440.

The RecvMsg( ) method in 426 may extract the classification identifier from the message 390 and may map the type of message to the RecvMsg( ) handler in the CWAPCApp object 428. Following the map of the message type the RecvRequest method 440b residing in the CWACPApp 428 is called. Following the WACPApp call 440c the RecvRequest in the application portion 416 in the WACPStub object 430.

Depend on the intent of the received message further information in the form of an MOIB object may be carried in the payload. The non CPI application software 430 may receive this payload 440d from WACPStub object 430 for processing and pass it 440e to an MOIB object library 432 containing the object class for the received payload into which the buffer can be deserialized for access to the variables(s) contained in the buffer.

Hypothetically, if the message 390 was a different type of MOMP message, for example, if the message 390 was a response or command type of MOMP message, as indicated by its second (genus) classification, the function pointer may store an address of a method, other than that of the RxRequestWrapper( ) method, which would be configured to process the type of message based on the first and second classification.

Next, the RxRequestWrapper( ) method of the CWACPApp object 428 may verify that the sender of the message has successfully passed a prior authentication check.

Next, the RecvRequest( ) method residing within the instance of the CWACPStub object 430 may switch on the values of the first classification identifier, FmNIBP, and may call 440c the RecvRequest( ) method of an instance of an CWACPStub object 430. Note that the text "NIBP" is unique to the first identifier of an extended module, i.e., FmNIBP.

The instance of the CWACPStub object 430 may optionally store application source code 432 in order to specify actions to be performed by the application software 416 in response to receiving the message 390 via the communication protocol interface 414. Hence, the CWACPStub object 430 may store both communication protocol interface 414, and application software 416 that may include MOIB software 434.

Reviewing the path of execution 440, the objects in 414 are core objects, meaning that the source code defining each of these objects is not configured to be a modifiable portion of the communication protocol interface.

In the embodiment described, the WACP software object CWACPStub 430 is a dynamic core object, meaning that at least some of the source code included within the definition of this object may be a modifiable portion of the communication protocol interface. In other embodiments, modifiable source code can be assigned to different sets of objects.

Core objects may be configured to be present within any foreseeable communication protocol interface configuration. Non-core (extensible) objects may exist in response to extensions of the communication protocol interface as defined by the Device Data Sheet. Hence, the objects 420-428 are core objects and the CWACPStub 430 object is non-core (extensible) objects within the communication protocol interface 414.

Note that functions names including a substring "Stub" indicate that the function is a stub function. A stub function may be a location within the source code where an application programmer adds application specific source code to connect the communication protocol interface 414 with the application software 416. In some embodiments, a stub function may be assigned for each message type defined for each module type. In some embodiments, stub functions may also be implemented as call back functions. Call back functions may be called from the communication protocol interface in response to a pre-specified event, such as the reception of a message.

FIG. 4C is a block diagram illustrating a path of execution through an embodiment of the communication protocol interface for transmitting a response type of message in response to receiving a request type of message as shown in FIG. 4A. The RecvRequest( ) method of the CWACPStub object 430 may include application software 432 configured to perform actions in response to receiving the message 390.

In response to receiving the message 390 of FIG. 4A, the application software 432 residing within the CWACPStub object 430 may call a SEND_RESPONSE( ) function which maps to a SendMsg( ) method residing in a CWACPApp object 428. The SendMsg( ) method of the CWACPApp object 428 may call a SendMsg( ) method residing within an instance of CMsgSvr object 426. The SendMsg( ) method of the CMsgSvr object 422 may map a first (family classification identifier to a function pointer and may call the function pointer. The function pointer may store an address of a SendMsgHandler( ) method residing within an instance of the CMsgSvr object 426. The instance of the SendMsgHandler( ) method may process the response type of MOMP message to be transmitted.

The SendMsgHandler( ) method may switch off a value of a second (genus) classification identifier and may call a TxMsg( ) method also residing within the same instance of the CMsgSvr object 426. The TxMsg( ) may call a function pointer that stores an address of a SendPacketWrapper( ) method residing within an instance of a CInterchange object 422.

Next, the SendPacketWrapper( ) method 440 may compare a semaphore name to an application name and then calls a SendPacket( ) method also residing within the CInterchange object 422. The SendPacket( ) method may serialize a response type of MOMP message and may call a SendMsg( ) method residing inside an instance of a CEthCommSvr object 420.

The SendMsg( ) method of the CEthCommSvr object 420 may call a send( ) function residing inside of a ws2_32.dll dynamic link library (ILL) to queue the message for transmission by the lower protocol stack 21A-210C. The ws2_32.dll is provided by Microsoft to interoperate with its Windows operating systems including Windows XP, Winders 2000, Windows NT and Windows Server 2003, for example. The operating system 412 may use the lower protocol stack 210A-210C to transmit the message 392 to a destination network element.

The communication protocol may be described in a specification that includes a core and an extensible portion. The communication protocol interface may not be entirely fixed and may be flexible and extensible beyond what is described by the core portion. The extensible portion may accommodate extended functionality particular to each individual network element. The extended functionality may be employed for communication of various types of data, commands and other information by each of the various types of network elements. The extended functionality can be customized to particular groups of one or more network elements.

Extended functionality may be added in the form of one or more extensible modules. Each module may be identified by a first (family) classification identifier and may be further characterized by other attributes, including those indicated by second (genus) classification identifiers and third (species) classification identifiers associated with the first classification identifier.

Each module may be defined from source code that specifies information, including data, procedures and messages, associated with each respective module. The messages may be employed to communicate various types of information between each respective module and other network elements. The procedures may be employed to perform operations upon the information and to communicate the information between the module and other network elements.

In some embodiments, the defined data may be classified into a configuration category and a data category. The data category may include data that the network element acquires from other sources, such as from a health care patient. The configuration category may include data specifying the operation of the particular network element for the purpose of acquiring the data from other sources.

Figure 5A:
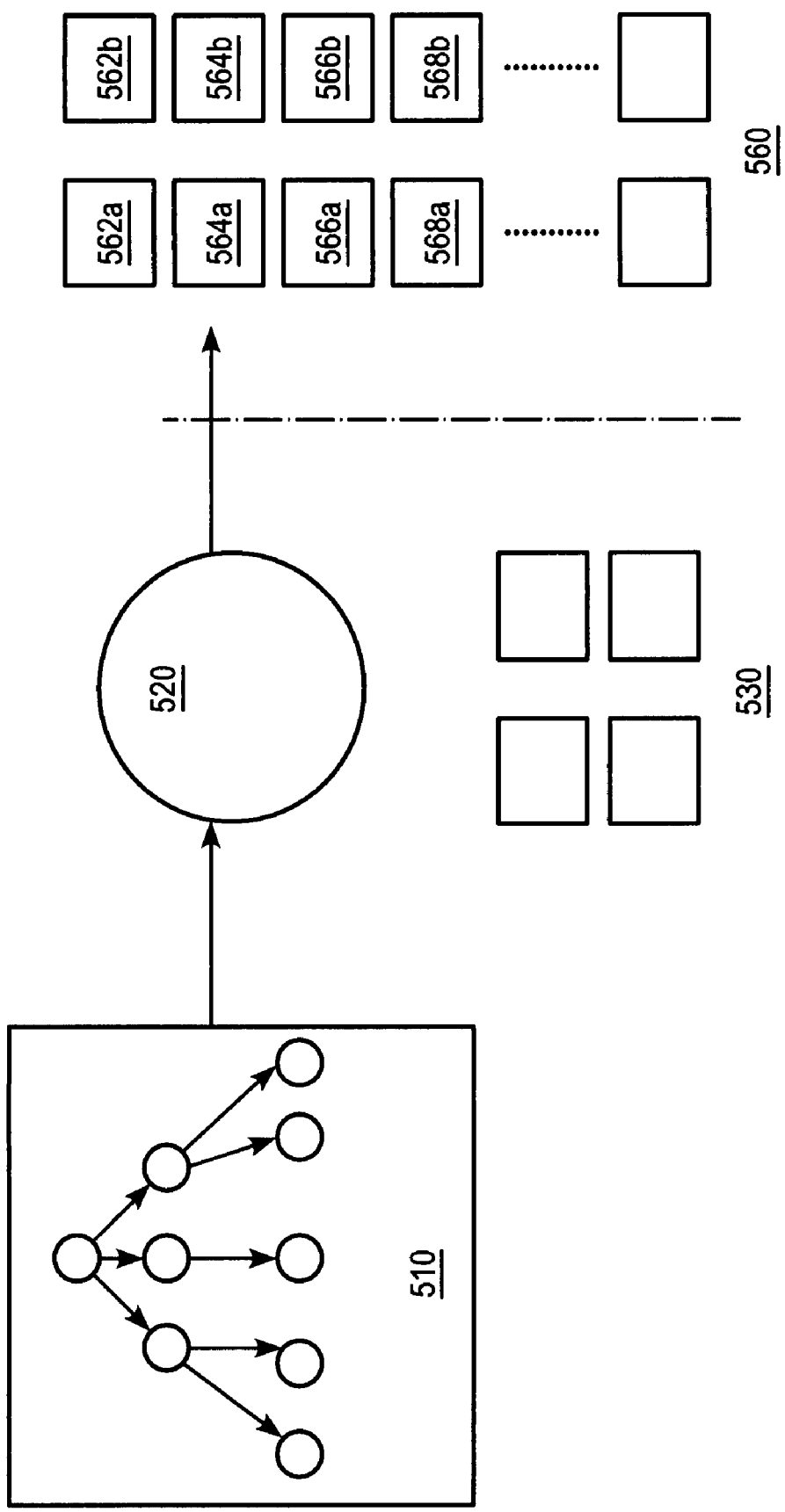
FIG. 5A illustrates a system that includes a software generator configured to input a set of data definitions and to output source code in response to the set of data definitions.

FIG. 5A illustrates a system 500 that includes a software generator program 520 configured to receive a set of data definitions in XML that represent a device data sheet (DDS). The DDS represents the taxonomy of a defined machine 510. The software generator program 520 outputs source code 560 in response to the set of data definitions 510 in the DDS. The data definitions may specify the addition of one or more modules of functionality, also referred to as extensible functionality, to the core functionality of the communication protocol interface 414.

The core functionality of the communication protocol interface 414 may be implemented as a core set of source code files 530 that include static (unrevised) core source code files 530. The newly created source code files 560 may be combined (compiled and linked) with the static source code files 530. The source code files 530 may be combined with the extensible set of source code files 560 via compiling or interpreting the source code files 560 and linking the compiled or interpreted binary with the compiled or interpreted binary of the core set 530 of source code files using appropriate software development tools.

In one use scenario, the source code files 530 are complied into linkable object (binary files and linked with object files constituting a remaining portion of the communication protocol interface 414.

In this use scenario, a compiler program, such as a C++ compiler, and a linker program are employed to produce a communication protocol interface 414 in the form of a library. The library can be a statically or a dynamically linked library. The library may be linked with the application software 416 embodied as object files that are compiled from source code. The newly created files 560 may embody source code that represents the extensible portion of the extensible portion 416.

In another use scenario, an interpreter program, such as a Microsoft Visual C++ interpreter and debugging program, may be employed to execute a communication protocol interface 414 in the form of an interpreted library. The library may be linked by the interpreter program with the application software 416 interpreted from application source code.

The following is a particular example of an embodiment of the application generator software 520. The data definitions 510 may specify the addition of one module identified by the name "FmNIBP". Other modules and functionality are possible. The substring "Fm" may indicate a module (family identifier, and the substring "NIBP" non-invasive blood pressure may identify a textual name of the particular module (family. The source code files 560 may be created in response to the software generator program 520 processing, including inputting and parsing of the data definitions in the DDS defining the NIBP module. Without the software generator program 520 processing the NIBP module data definitions, the source code files 560 would not exist for use in the application software 416.

In this particular example, the FmNIBP module may cause the creation of source code files named CNIBPCStd.h 566a, CNIBPCStd.cpp 566b, CNIBPDStd.h 568a, and CNIBPDStd.cpp 568b. Note that the filenames of the aforementioned source code files 562a-568b each include the text "NIBP".

Furthermore, the FmNIBP module may cause revision, including the addition of source code, to the pre-existing source code files named CWACPStub.h and SWACPStub.h. Other pre-existing source code files 530 of the core set of source code files 550 remain un-revised after processing the FmNIBP data definitions. Note that the filenames for the core set of source code files 530 do not include the text "NIBP".

Figure 5B:
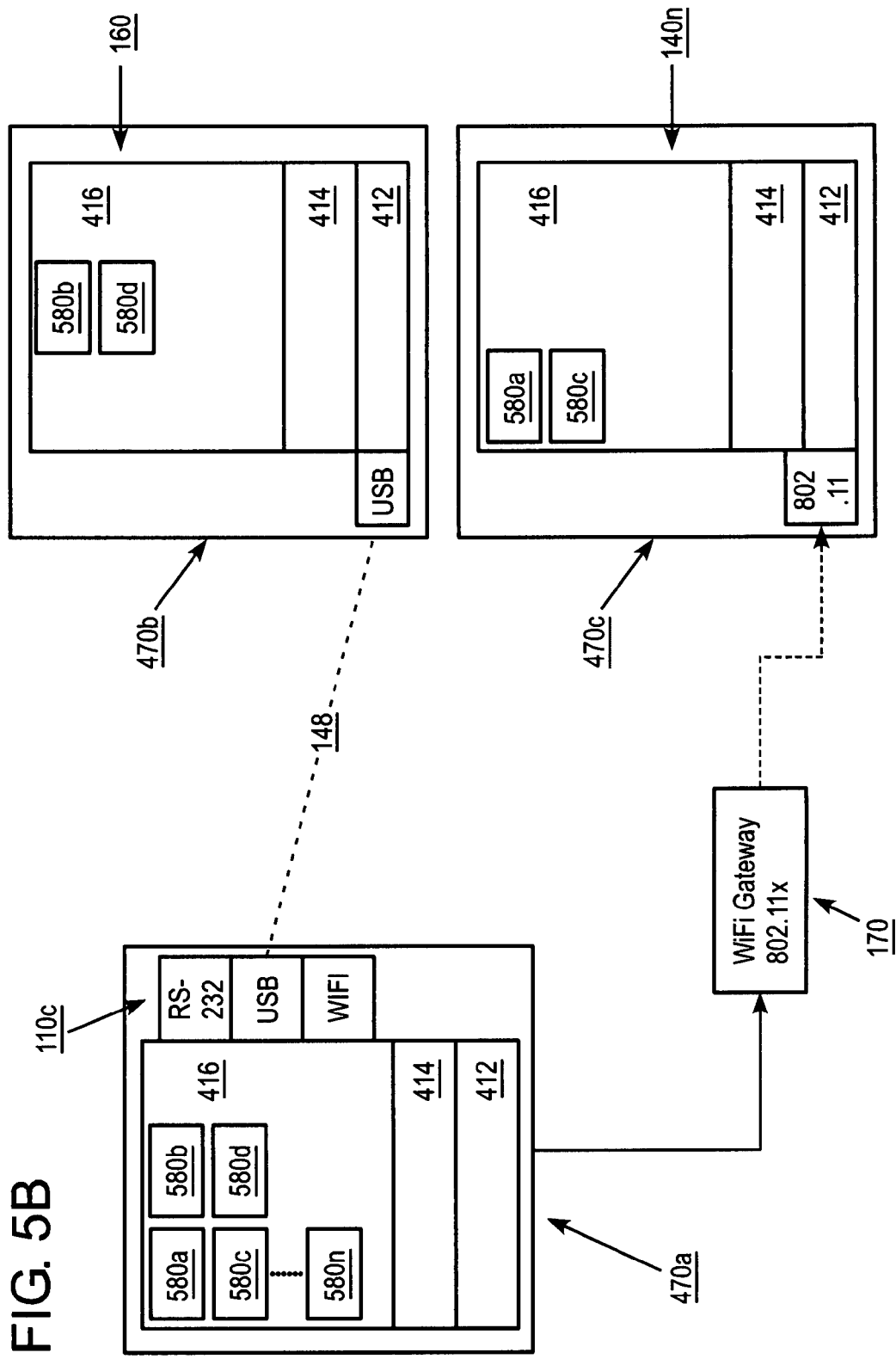
FIG. 5B is a block diagram illustrating the different configurations of communications protocol interface software that are installed onto a plurality of interoperating network elements.

FIG. 5B is a block diagram illustrating different configurations of the communication protocol interface 414 installed onto a plurality of interoperating network elements 110C, 140N, 160. A host or server computer 110C may include a communication protocol interface 416 configured to include modules 580a-580n. A VSMD 140N may include a communication protocol interface 416 configured to include two modules 580a and 580c. The VSMD 140N may communicate with the host or server computer 110C via a WiFi 802.11 communications channel via a WiFi gateway 170. Another network device 160 may include a communication protocol interface 416 configured to include two modules 580b and 580d. The other network device 160 may communicate with the host or server computer 110C via a USB communications channel 148.

Note that both the VSMD 140N and the other network device 160 may employ the same core communication protocol interface 414 yet acquire, process and communicate different types and structures of data to a common host or server computer 110C. The host or server computer 110C may be configured to interoperate with both the VSMD 140N and the other network device 160.

Figure 5C:
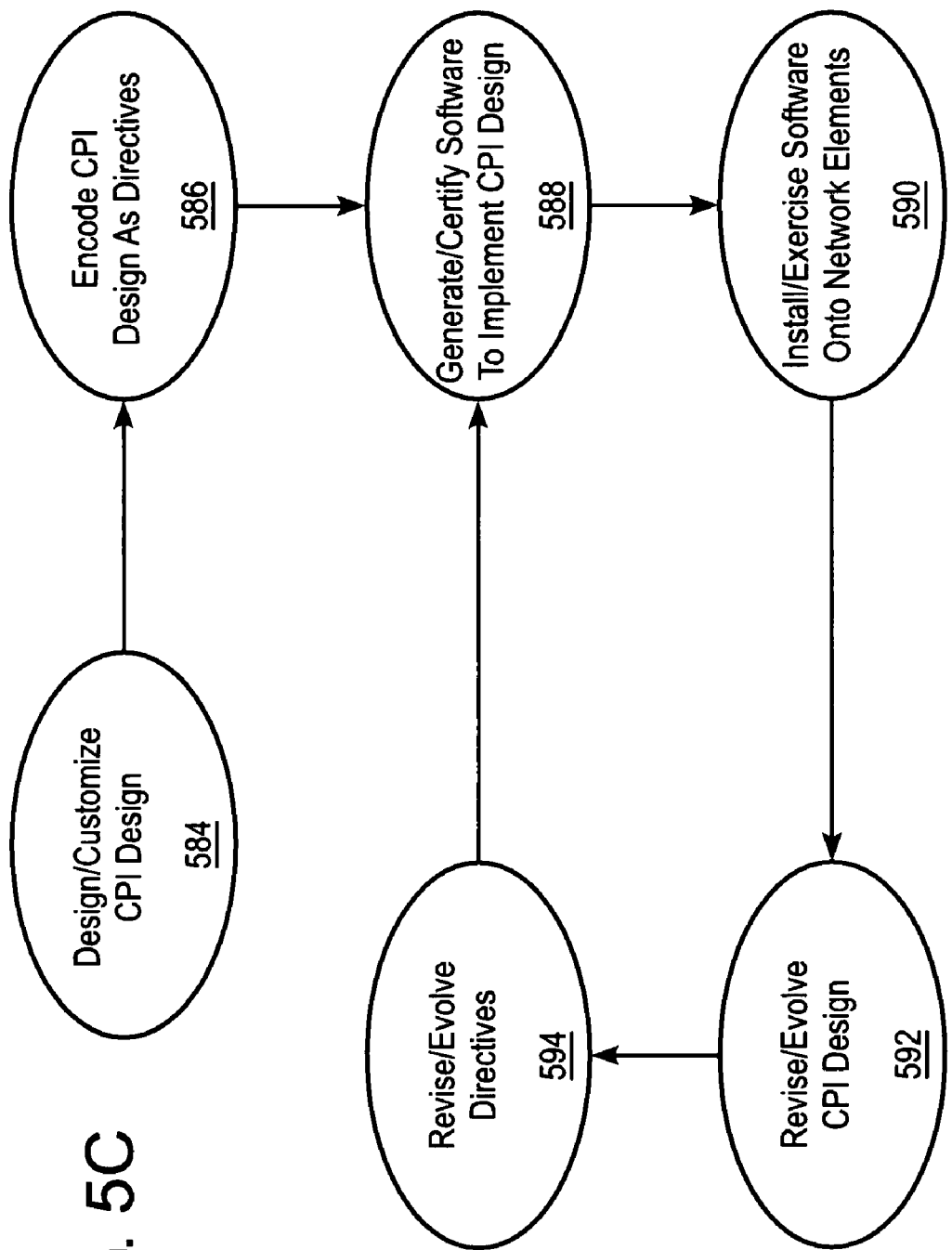
FIG. 5C illustrates a flow chart for designing, evolving, automatically generating, and certifying software that implements a communications protocol interface.
Figure 5D:
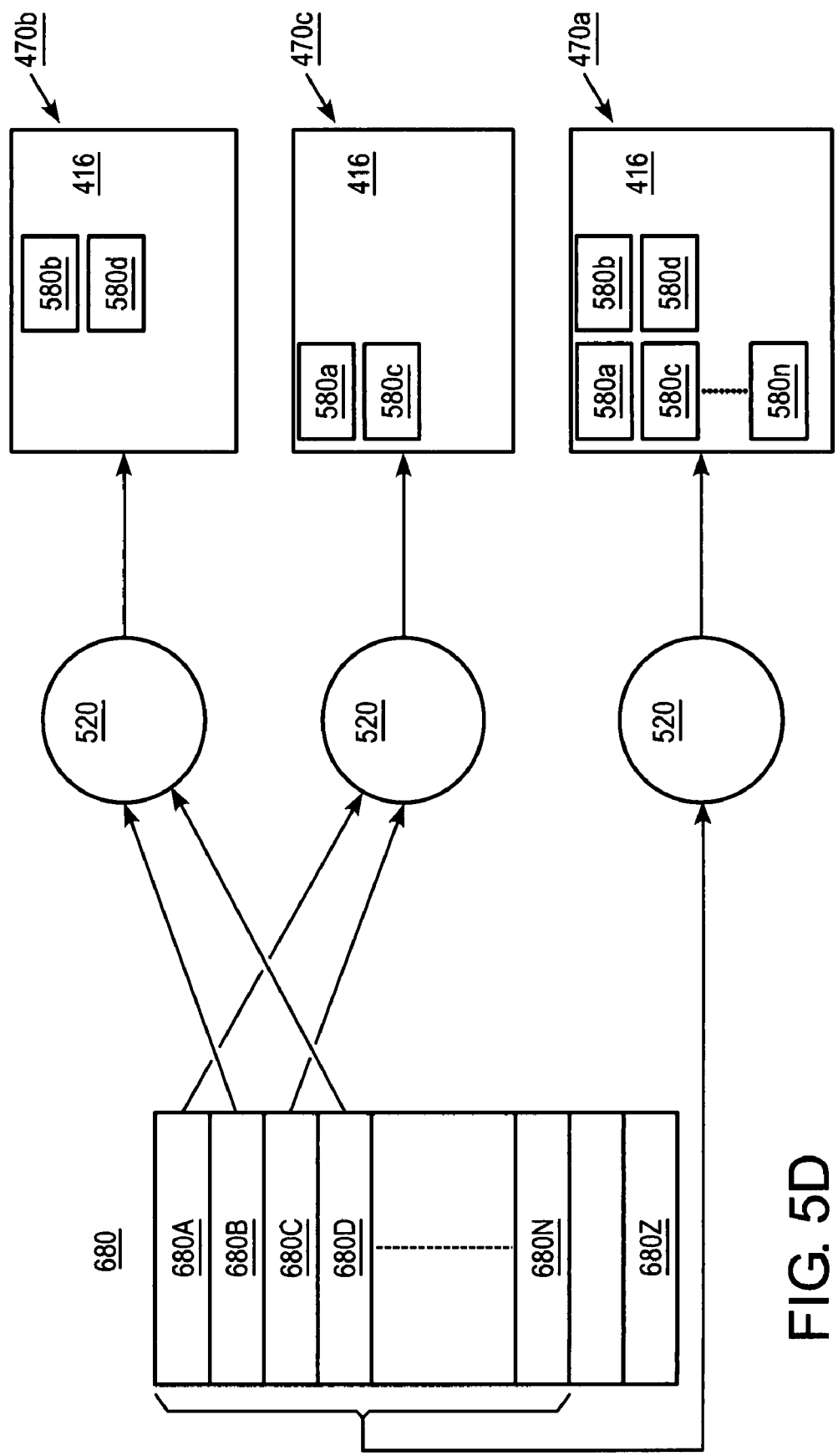
FIG. 5D illustrates portions of a global set of modules being built into different configurations.

Modules that are common to two or more of the three configurations 470a-470c may be generated from the same global set of data definitions (See FIG. 5D). The extensible portion of the communication protocol interface may be customized such that each network element 110C, 140N, 160 can be installed with a customized configuration 470a-470c and communicate a unique and optionally small subset of actual data that corresponds to at least a portion of a larger defined data set.

A module common to more than one configuration 470a-470c may constitute a complementary overlap between the more than one configuration. Another form of complementary overlap may occur where a first configuration (built from a first set of one or more modules of data definitions) includes a first module and a second configuration (built from a second set of one or more modules of data definitions) includes a second module, where the first module is configured to transmit a set of message types and where said second module is configured to receive said set of message types.

FIG. 5D illustrates portions of a global set of data definitions 680 built into different configurations. The global set of data definitions 680 for an entire system of network elements may include data definitions for modules 680*a* through 680*z*. Data definitions of module 680*b* and 680*d* may be input into a software generator program 520 and output as software including software modules 580*b* and 580*d*. Data definitions of module 680*a* through 680*n* may be input into the software generator program 520 and output as software including software modules 580*a* through 580*n*.

The global data set of data definitions 680 may be a superset of data definitions that includes data definitions for all modules defined for an entire system that includes all communicating network elements. The global set of data definitions 680 may conform to a defined data model supporting an entire system of interoperating network elements.

Portions of the global set of data definitions 680 may be input into the software generator program 520 to generate custom configurations 470*a*-470*c*, which are configured to interoperate with each other. In some embodiments, the global set of data definitions 680 may include a physiological data description. Portions of the global set of data definitions 680 may be referred to as a data description sheet ADS).

In some embodiments, the data of the system may be defined and structured as MOIB 3000 data objects. A data object may be an object that encapsulates data processed in particular ways by software of the system. Data objects may be implemented as a data only portion of software objects, such as a portion of C++ or Java class objects. Although software objects may encapsulate both instructions and data, MOIB data objects may encapsulate only data.

Software objects may typically be represented as classes defined within a class hierarchy. In some embodiments, data objects may be represented by data only classes within a class hierarchy. Data objects may reside as a portion of software that implements a module. MOIB data objects may be serialized when transmitted from a first network element and de-serialized when received by another second network element. The design of this type of embodiment may enable data objects to have attributes of software objects. For example, data objects can be defined within the context of a class hierarchy and inherit attributes of various classes that may also define other objects.

In some embodiments, at least one attribute may enable software objects and MOIB data objects to be version classified and version identifiable by software components that interoperate with the software and data objects during runtime execution. Configurations built from data definitions defining data of a later version, can interoperate and process data from configurations built with data definitions of an earlier version.

In some embodiments, a policy may be enforced when entering or revising MOIB data definitions where new data is defined and located within a particular module after previously defined data. Hence, new data may be defined and appended (located) after previously defined data within a module and the data definitions may distinguish particular data by a chronology of their definition within the module in order to indicate data having an earlier associated version from data having a later associated version.

As a result, a communication software module can extract data having an earlier associated version from one or more software object classes that include data having a later associated version. For example, a first network element executing a first communications software module that implements a module of a later version can recognize and process data received from a second network element executing a second communications software module that implements the same module of an earlier version. This benefit may result from a policy of entering and revising data definitions that ensures that a location of the earlier versioned data within the later versioned module is the same as the location of the earlier versioned data within the versioned module, because the earlier versioned data may have the same physical offset within both the earlier and later versioned modules.

To further take advantage of this benefit, a network element operating as a central hub, such as the host or server computer 110C, is preferably installed with a communication protocol interface 416 and data of one or more modules of a later or equal version than data of one or more modules of other more peripheral types of network elements that are not operating as a central hub. A policy regarding software and data version upgrades of various network elements to take advantage of the aforementioned benefit can ensure continuity interoperation (backward version compatibility) between network elements with respect to data objects and the communication protocol interface 416 that processes those data objects. Such a policy can maintain interoperability of a plurality of network elements while accommodating evolution of the data over time.

Data objects processed by the system may be defined and structured using extensible markup language (XML) according to rules that parallel the rules of an object oriented programming language, such as C++ and that adhere to the reference taxonomy in FIG. 3A-1. The definition and structure of the MOIB data objects may be stored into one or more data definition files. In some embodiments, the data definition files may be based upon classification of physiologic types.

FIG. 5C illustrates a flow chart for designing and evolving, and automatically generating and certifying a communication protocol interface 416. Computing environments may each require communication of particular types and structures of data. The invention may enable different network devices to communicate using a common interoperable communications protocol interface 416 configured to enable communication of the particular types and structures of data.

In some embodiments, the types and structures of data can include aspects of human or other physiology. For example, the data can represent systolic and/or diastolic blood pressure, heart rate, electrocardiogram signals (ECG) or SPO2 measurements associated with one or more patients. If separate monitoring devices represent and communicate acquired physiology data differently, the communication protocol interface may enable each of the different devices to communicate their acquired physiology data in the same structure and format, according to a particular communication protocol interface specification and implementation.

In other embodiments, the data can represent information acquired from devices that monitor the status of entities, such as people, places or things located within various types of environments. Such things can include equipment within a retail, banking, manufacturing, or a health care environment, for example.

As a first step 584, responsible personnel identify a communications protocol interface scheme that best suits a particular application involving a network communication environment. Accordingly, a communications protocol interface specification is identified. The communications protocol interface specification may be identified by responsible personnel by selection or design. The personnel may have the option to design an original communication protocol interface specification or to select a pre-existing communications protocol interface specification. If the communication protocol interface specification is designed, then the communication protocol interface specification may be encoded 586 as a set of data definitions in a DDS defining one or more modules of functionality. If the communication protocol interface specification is selected, and associated pre-existing data definitions are available, then pre-existing data definitions may be associated with the selected communication protocol interface specification.

The software generator program 520 may be executed by inputting the set of data definitions. The software generator program 520 may output 588 an extensible portion 416 that implements the communication protocol interface specification. The extensible portion 416 may comply with the set of data definitions that describe the designed or selected communication protocol interface specification. The core portion 414 of the communication protocol interface may be combined and linked with the extensible portion 416 to generate a complete communication protocol interface.

In some embodiments, the core portion 414 may include operating system dependent software while the extensible portion 416 may include operating system independent software.

The complete communication protocol interface, implementing the core portion 414 and extensible portion 416, may be installed and exercised 590 on a plurality of network elements, such as 110A-110C, 140A-140N, and 160. Each instance of a communication software module installed onto a network element may enable that network element to communicate and interoperate with other network elements.

After installation and during operation, particular types and structures of data may be serialized by the MOIB protocol interface and then transmitted and received using MOMP protocol from a first network element and de-serialized by the MOIB protocol interface receiving data from a second network element.

If MOMP communications requirements for the computing environment evolve over time, the design of the communication protocol interface specification may be revised 592 to accommodate the evolved communications requirements. Likewise, the MOIB data definitions that represent the data protocol interface specification may also be revised 594 to accommodate the evolving communications requirements.

The software generator program 520 may be re-executed 588 to input the revised set of data definitions and to output a revised extensible portion 416 that implements the revised communication protocol interface specification. The extensible portion 416 may be re-generated in compliance with the revised set of data definitions that describe the re-designed or re-selected communication protocol interface specification. A core portion 414 may be linked with the re-generated extensible portion 416 to produce a complete communication protocol interface.

The step of generating software that implements the extensible portion of the CPI specification may be more accurate and reliable than creating software manually by line for line entry of course code via programmers. In effect, the extensible 416 generated by the application generator program 520 is certified for compliance with the communication protocol interface as represented by the data definitions.

FIG. 6A illustrates a set of data definitions 610 that define a plurality of extensible modules encoded in Extensible Markup Language (XML). The data definitions 610 may include an XML declaration or version statement 612, an XML root element tag 614, named "DDS DEMO", and other XML element tags named "FAMILY_NIBP" 616, "FAMILY_ERROR" 618, "FAMILY_BATTERY" 618, "FAMILY_DTCOLLECTION" 622, and "FAMILY_WAVE" 624.

Each of the aforementioned element tags may be associated with a same named XML element. For example, the FAMILY_NIBP element tag may represent a FAMILY_NIBP element and the FAMILY_BATTERY element may represent a FAMILY_BATTERY element. XML elements associated with each of the element tags 616-624 are unexpanded in FIG. 6A and can include other nested XML elements.

FIG. 6B illustrates the set of data definitions 610 of FIG. 6A including XML element tags nested one level below the <FAMILY_NIBP>element. The <FAMILY_NIBP>element may include information located between the <FAMILY_NIBP>element start tag 616 and the <FAMILY_NIBP>element end tag 638. The <FAMILY_NIBP>element in FIG. 6B is expanded to reveal one level of element tags below it. The element tags located one level below the FAMILY_NIBP>element may be referred to as child elements of the FAMILY_NIBP>element and may be named "SPECIES KEY" 630, "CNIBPDSTD_DEFINITION" 632, "CNIBPDSTD_DEFINITION" 634 and "MESSAGES" 636. A <FAMILY_NIBP>element end tag 638 marks the end of the XML defining the FAMILY_NIBP XML element.

The XML defining the FAMILY_NIBP element includes MOIB data definitions and MOMP message definitions referred to as FAMILY_NIBP module definitions, located between the <FAMILY_NIBP>element start tag 616 and the element end tag 638 and that define the FAMILY_NIBP module. The XML defining the FAMILY_NIBP including the FAMILY_NIBP module definitions may be input into the software generator 520 to generate source code for the FAMILY_NIBP module. The source code may be stored within the source code files 562a-568b of FIG. 5A.

FIG. 6C illustrates XML element tags located one level below the <MESSAGES> 636 element of the <FAMILY_NIBP>element of the set of MOMP message definitions 610 of FIG. 6A. As shown, a series of element tags 642a-642 are each named "MsG" and each represent a <MSG>element nested below the MESSAGES>element 636. Each <MSG>element may be defined with type, name and description attribute. For example, the <MSG>element 642 may have a type attribute value of "Request," a name attribute value of "GET_BP" and a description attribute of "Get BP".

Each element may have its own unique scope of functionality, and its own unique set of stored data, and a standard set of messages that it transmits and receives. An element may be identified to a software generator program 520 via a first (family classification identifier, such as supplied by the <FAMILY_NIBP> 616 or FAMILY_BATTERY> 620 element tags that are located one level below the root tag 614 of the data definitions 610.

Within (nested below) a family element, the software generator 520 may interpret certain data definitions to be second (genus) classification identifiers and third (species) classification identifiers associated with the first (family classification identifier the element.

In the example embodiment, the software generator program 520 may interpret certain attributes of each <MSG>element type to be either a second (genus) classification identifier or a third (species) classification identifier. The software generator program 520 may interpret the "type" attribute value to be a second (genus) classification identifier and may interpret <MSG>element "name" attribute value to be a third (species) classification identifier.

As a result, the software generator program 520 may interpret the messages of the FAMILY_NIBP module to have eight messages that are each associated with one of eight third (species) classification identifiers and that are associated with one of four second (genus) classification identifiers. For example, the <MSG>element 642 may represent a message having a second (genus) classification identifier represented by a "Request" identifier and a third (species) classification identifier represented by a "GET_BP" identifier.

A second (genus) classification identifier value equal to "Request" may indicate that the associated message is a request type of message (See FIG. 3B). A third (species) classification identifier value equal to "GET_BP" may indicate a particular message structure. Hence, the "GET_BP" message structure is a request type of message.

In response to inputting the <MSG>element 642, the software generator program 520 may generate source code for the FmNIBP module that processes a "GET_BP" message structure, being a request type of message, like that described for FIGS. 4A-4C Likewise, the software generator program 520 may generate source code for the FmNIBP module that processes a message described by the other <MSG>elements 642b-642h.

FIG. 6D illustrates XML element tags located one level below the <CNIBPCSTD_DEFINITION> 634 element of the <FAMILY_NIBP>element of the set of data definitions 610 of FIG. 6A. As shown, elements named "STATIC_MEMBERS" 658 and "ENUMERATIONS" 660 are nested below the <CNIBPCSTD_DEFINITION> 634 element. Elements named "VAR" are nested below the <STATIC_MEMBERS> 658 element. Elements named "ENUM" are nested below the <ENUMERATIONS> 660 element.

The <CNIBPCSTD_DEFINITION>element 634 may be defined with a class, abrv, version, family, genus and species attribute. The <CNIBPCSTD_DEFINITION>element 634 may have a class attribute value of "CNIBPCStd," an abrv attribute of "CNBPCSTD," a version attribute of "102," a family attribute of "FmNIBP," a genus attribute of "GnCONFIG", and a species attribute of "SpSTANDARD".

In the example embodiment, the software generator program 520 may interpret the <CNIBPCSTD_DEFINITION>element 634 as representing a C++ software object class having a name of "CNIBPCStd". In response to inputting the <CNIBPCSTD_DEFINITION>element 634, the software generator program 520 may generate source code for the FmNIBP module that allocates an object class named "CNIBPCStd". The C++ programming language is one of many object oriented programming languages that may be used.

The element tags 646a-646b are each named "VAR" and may each represent a <VAR>element that is nested below the <STATIC_MEMBERS>element 644. Each <VAR>element may be defined with a type, a name and comment attribute. For example, the <VAR>element 646a has a type attribute value of "uint16", a name attribute value of "DisplayUnits" and a comment attribute of "Display units for BP and MAP".

In the example embodiment, the software generator program 520 may interpret <VAR>element as representing data variable (stored data), the "type" attribute value "uint16" to be a data type of the data variable, and the "name" attribute value "DisplayUnits" to be a name of the data variable. In response to inputting the <VAR>element 646a, the software generator program 520 may generate source code for the software object class named "CNIBPCStd" within the NIBP module. The NIBP module may allocate a data variable having a type attribute of "uint16" and a name (identifier) of "DisplayUnits". The data type value equal to "uint16" may indicate that the associated data variable is an unsigned 16 bit integer.

The element tags 652a-652e are each named "ENUM" and may each represent an <ENUM>element nested below the <ENUMERATIONS>element 650. Each <ENUM>element may be defined with a type, name, default value and a description attribute. For example, the <ENUM>element 652a may have a type attribute value of "DisplayUnits", a name attribute value of "NIBP_MMHG", a default value of "0", and a description attribute of "mmHg". In the example embodiment, the software generator program 520 may interpret the <ENUM>element as representing a C++ enumeration type declaration and may interpret the "type" attribute value, "DisplayUnits", as the named data type of the enumeration type declaration and the "name" attribute value of "NIBP_MMHG" to be an enumeration type declaration member along with any other <ENUM>elements of the same type. In response to inputting the <ENUM>element 652a, the software generator program 520 may generate source code for the NIBP module that declares an enumeration data type having a type attribute of "DisplayUnits" and an identifier of CNIBPDSTD_DISPLAYUNITS.

The source code generated for the NIBP module may look as follows:

```
typedef enum CNBPCSTDtypDISPLAYUNITS {
    CNBPCSTD_DisplayUnits_NIBP_MMHG = 0,
    CNBPCSTD_DisplayUnits_NIBP_KPA,
    CNBPCSTD_DisplayUnits_MAX
} CNBPCSTD_DISPLAYUNITS;
```

FIG. 6E illustrates some of the XML element tags located one level below the <CNBPCSTD_DEFINITION> 632 element of the <FAMILY_NIBP>element 616 of the set of data definitions 610 of FIG. 6A. As shown, elements named "STATIC_MEMBERS" 654 and "ENUMRATIONS" 660 are nested below the <CBPCSTD_DEFINITION> 632 element. Elements named "VAR" are nested below the <STATIC_MEMBERS> 654 element. Elements named "ENUM" are nested below the <ENUMERATIONS> 660 element.

The <CNBPCSTD_DEFINITION>element 632 may be defined with class, abrv, version, family, genus and species attribute. The <CNBPCSTD_DEFINITION>element 632 may have a class attribute value of "CNIBPDStd", an abrv attribute of "CNBPDSTD", a version attribute of "105", a family attribute of "FmNIBP", a genus attribute of "GNDATA" and a species attribute of "SpSTANDARD".

In the example embodiment, the software generator program 520 may interpret the <CNBPCSTD_DEFINITION>element 632 as representing a C++ software object class having a name of "CNIBPDStd". In response to inputting the <CNBPCSTD_DEFINITION>element 632, the software generator program 520 may generate source code for the FmNIBP module that allocates a software object class named "CNIBPDStd".

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A non-transitory computer-readable storage medium carrying one or more sequences of instructions for controlling communications between one or more network devices, which instructions, when executed by one or more processors, cause the one or more processors to carry out the steps of:
   transferring a communication through an upper protocol stack, wherein the upper protocol stack is operable by application software, the application software:
      defining a data transfer protocol including a medical object management protocol layer defining hierarchical classification fields;
      processing the communication according to the hierarchical classification fields to identify:
         a highest family classification field defining classes of physiological data including blood pressure, temperature, and pulse oximetry,
         a middle genus classification field defining one or more attributes of the highest family classification field, including requesting data, responding with data, commands, continuously report data, and request status information, and
         a lowest species classification field defining a particular data type including getting data and putting data associated with blood pressure, temperature, and oximetry, and
      interpreting the communication based on the processing of the hierarchical classification fields; and
   transferring the communication through an interchange layer between the upper protocol stack and a lower protocol stack, the communication transferred through the interchange layer establishing a connection between a first network device and a second network device, at least one of the first network device or the second network device being a medical device.

2. The non-transitory computer-readable storage medium of claim 1, wherein the upper protocol stack further comprises a link management protocol, wherein the link management protocol establishes and terminates connections between the one or more network devices.

3. The non-transitory computer-readable storage medium of claim 1, further comprising receiving the communication at the upper protocol stack from an application layer.

4. The non-transitory computer-readable storage medium of claim 1, further comprising receiving the communication at the lower protocol stack from a network device.

5. The non-transitory computer-readable storage medium of claim 1, wherein the classification fields comprise a first classification field identifying a particular software module within the data transfer protocol having an associated set of message and information types.

6. The non-transitory computer-readable storage medium of claim 5, wherein the classification fields comprise a second classification field identifying a set of one or more attributes of the first classification field.

7. The non-transitory computer-readable storage medium of claim 6, wherein the classification fields comprise a third classification field identifying a set of one or more additional attributes of the software module identified by the first classification field and the one or more attributes identified by the second classification field.

8. A communication protocol system comprising:
   a host computer,
   a network link at the host computer for communicating between the host computer and one or more network devices,
   a database in communication with the host computer for storing data from the host computer, and
   communications protocol software on the host computer for processing communications between the host computer and the one or more network devices,
   the communications protocol software comprising an upper protocol stack operable by application software and a lower protocol stack operable by operating system software,
      the application software defining a data transfer protocol including a medical object management protocol layer defining hierarchical classification fields, the communications between the host computer and the one or more network devices being processed according to the hierarchical classification fields to identify:
         a highest family classification field defining classes of physiological data including blood pressure, temperature, and pulse oximetry;
         a middle genus classification field defining one or more attributes of the highest family classification field, including requesting data, responding with data, commands, continuously report data, and request status information, and
         a lowest species classification field defining a particular data type including getting data and putting data associated with blood pressure, temperature, and oximetry,
      the communications between the host computer and the one or more network devices being interpreted based on the processing of the hierarchical classification fields.

9. The system of claim 8, further comprising one or more additional host computers in communication with the host computer.

10. The system of claim 8, wherein the communicating between the host computer and the one or more network devices is performed by connections selected from the group consisting of WiFi, serial, USB and combinations thereof.

11. The system of claim 8, wherein communications from the one or more network devices are received in a format compatible with the communications protocol software.

12. The system of claim 11, wherein the communications from the one or more network devices contain values corresponding to the first classification, the second classification and the third classification.

* * * * *